US012338657B2

(12) United States Patent
Kumar et al.

(10) Patent No.: US 12,338,657 B2
(45) Date of Patent: Jun. 24, 2025

(54) DOOR LATCH

(71) Applicant: Schlage Lock Company LLC, Carmel, IN (US)

(72) Inventors: Hassan C. Kumar, Bangalore (IN); Nathanael S. Murphy, Colorado Springs, CO (US); Peter Malenkovic, Monument, CO (US); Allen Mani, Thrissur (IN); Madhu H. Siddaramaiah, Maddur (IN)

(73) Assignee: Schlage Lock Company LLC, Carmel, IN (US)

( * ) Notice: Subject to any disclaimer, the term of this patent is extended or adjusted under 35 U.S.C. 154(b) by 8 days.

(21) Appl. No.: 18/521,017

(22) Filed: Nov. 28, 2023

(65) Prior Publication Data

US 2024/0352770 A1 Oct. 24, 2024

Related U.S. Application Data

(63) Continuation of application No. 17/590,458, filed on Feb. 1, 2022, now Pat. No. 11,828,088, which is a continuation of application No. 16/726,478, filed on Dec. 24, 2019, now Pat. No. 11,236,527, which is a continuation of application No. 15/466,283, filed on Mar. 22, 2017, now Pat. No. 10,513,872.

(60) Provisional application No. 62/312,211, filed on Mar. 23, 2016.

(51) Int. Cl.

| | |
|---|---|
| ***E05B 63/06*** | (2006.01) |
| ***E05B 9/02*** | (2006.01) |
| ***E05B 55/00*** | (2006.01) |
| ***E05B 55/12*** | (2006.01) |

(52) U.S. Cl.
CPC ................ *E05B 63/06* (2013.01); *E05B 9/02* (2013.01); *E05B 55/005* (2013.01); *E05B 55/12* (2013.01)

(58) Field of Classification Search
CPC ..... E05B 9/00; E05B 9/02; E05B 9/04; E05B 55/00; E05B 55/005; E05B 55/06; E05B 55/12; E05B 63/00; E05B 63/06
USPC ........................................................ 292/1.5
See application file for complete search history.

(56) References Cited

U.S. PATENT DOCUMENTS 2,592,573 A * 4/1952 Joncas .................... B60R 21/08 280/753
2,795,447 A * 6/1957 Schlage .................. E05C 1/163 292/336.5
4,653,787 A * 3/1987 Fang ....................... E05B 63/06 292/169.14

(Continued)

*Primary Examiner* — Nathan Cumar
(74) *Attorney, Agent, or Firm* — Taft Stettinius & Hollister LLP

(57) ABSTRACT

A latch assembly that is adjustable between first and second backset settings. A cam is rotatable about a cam axis, and facilitates linear displacement of a latch link in a first direction. A multiplier link is rotatable about a multiplier link axis that is offset from the cam axis can be rotated in the first rotational direction by engagement with the latch link. A latch bar is coupled to the multiplier link and is linearly displaced in a second direction by rotation of the multiplier link in the first direction. The latch apparatus also includes a latch bolt that is coupled to the latch bar, the latch bolt being displaced toward a retracted position by the displacement of the latch bar in the second direction. The latch assembly can also include a dead latch link can block retraction of at least the latch bolt.

16 Claims, 19 Drawing Sheets

(56) References Cited

U.S. PATENT DOCUMENTS

| | | | | | |
|---|---|---|---|---|---|
| 4,711,477 | A * | 12/1987 | Fann | E05B 63/06 292/DIG. 60 |
| 4,746,154 | A * | 5/1988 | Fang | E05B 63/06 292/1 |
| 4,767,140 | A * | 8/1988 | Lin | E05B 63/06 292/DIG. 60 |
| 4,974,883 | A * | 12/1990 | Jans | E05C 1/163 292/169.14 |
| 5,152,558 | A * | 10/1992 | Smith | E05B 63/06 292/1.5 |
| 5,257,837 | A * | 11/1993 | Bishop | E05B 63/06 292/DIG. 60 |
| 5,498,037 | A | 3/1996 | Fan Lai | |
| 5,501,492 | A * | 3/1996 | Kajuch | E05B 63/06 292/DIG. 60 |
| 5,570,912 | A * | 11/1996 | Mullich | E05B 63/06 292/1.5 |
| 5,647,617 | A | 7/1997 | Kajuch | |
| 6,419,288 | B1 * | 7/2002 | Wheatland | E05C 1/163 292/DIG. 60 |
| 6,612,627 | B2 * | 9/2003 | Wheatland | E05C 1/163 292/DIG. 60 |
| 6,991,271 | B2 * | 1/2006 | Chiang | E05B 63/06 292/1.5 |
| 7,497,486 | B1 * | 3/2009 | Davis | E05B 15/0205 292/169.14 |
| 8,360,482 | B2 | 1/2013 | Viviano | |
| 8,702,131 | B1 * | 4/2014 | Gianoli | E05B 63/044 292/DIG. 60 |
| 8,864,186 | B2 | 10/2014 | Kondratuk | |

* cited by examiner

DOOR LATCH

CROSS-REFERENCE TO RELATED APPLICATIONS

The present application is a continuation of U.S. patent application Ser. No. 17/590,458 filed Feb. 1, 2022 and issued as U.S. Pat. No. 11,828,088, which is a continuation of U.S. patent application Ser. No. 16/726,478 filed Dec. 24, 2019 and issued as U.S. Pat. No. 11,236,527, which is a continuation of U.S. patent application Ser. No. 15/466,283 filed Mar. 22, 2017 and issued as U.S. Pat. No. 10,513,872, which claims the benefit of U.S. Provisional Patent Application No. 62/312,211 filed Mar. 23, 2016, the contents of each application incorporated herein by reference in their entirety.

TECHNICAL FIELD

Embodiments of the present application generally relate to latch mechanisms. More particularly, but not exclusively, embodiments of the present application relate to tubular latch mechanisms with accelerated bolt motion for multiple backset settings.

BACKGROUND

Certain locksets typically include a lock chassis assembly that is engaged with a latch assembly. Often, at least a portion of the lock chassis is installed in a cylindrical hole or opening in a door. The distance between the centerline of the opening relative to a side edge of the door is often referred to as the backset. The latch assembly that mates with the lock chassis often extends through a latch hole that extends from the side edge of the door to the cylindrical hole or opening. However, the distance that the latch assembly is to extend along at least the latch hole so as to operably engage the lock chassis may vary. More specifically, the backset setting may vary for different doors and/or applications. For example, traditionally, entryway devices can have backset settings of either 2⅜ inches or 2¾ inches. Thus, proper installation of the latch assembly often requires that the latch assembly be configured to accommodate the particular backset for that door. If this criterion is not met, the lockset may fail to function properly.

Additionally, lever or doorknobs often need to be turned approximately one-quarter of a revolution, such as, for example, rotated about 80 degrees to about 90 degrees, to displace the latch bolt of the latch bolt assembly from an extended, locked position to a retracted, unlocked position. Typically, when displaced to the retracted position, the latch bolt is withdrawn from extending into an strike opening in a frame or wall so that the latch bolt is at a position that does not prevent the associated entryway device (e.g., a door or gate) from being displaced from a closed position about an entryway to an open position. Further, the ability to accommodate bi-directional rotational displacement of the lever or doorknob to retract the latch bolt, as well as providing a latch assembly that is adjustable for different backsets, can increase the degree to which the lever or doorknob is to be rotated before the latch bolt reaches the retracted position.

BRIEF SUMMARY

Certain embodiments of the present application relate to a latch assembly that is adjustable between first and second backset settings. According to some embodiments, the latch assembly can include at least one cam that is rotatable about a cam axis, and a latch link that is linearly displaceable in a first direction by engagement with the at least one cam as the at least one cam is rotated in a first rotational direction. The latch assembly also includes a multiplier link that is rotatable about a multiplier link axis that is offset from the cam axis. The multiplier link can be rotatable in the first rotational direction by engagement with the latch link as the latch link is linearly displaced in the first direction. The latch assembly also includes a latch bar that is coupled to the multiplier link, the latch bar being linearly displaced in a second direction by rotation of the multiplier link in the first direction, the second direction being opposite of the first direction. The latch assembly also includes a latch bolt that is coupled to the latch bar, the latch bolt being displaced toward a retracted position by the displacement of the latch bar in the second direction. The latch assembly can also include a dead latch assembly having a dead latch link that is displaceable between a dead-latching position and a release position, the dead latch link blocking retraction of the latch bolt when the dead latch link is in the dead-latching position.

BRIEF DESCRIPTION OF THE DRAWINGS

The description herein makes reference to the accompanying figures wherein like reference numerals refer to like parts throughout the several views.

Figure 1A:
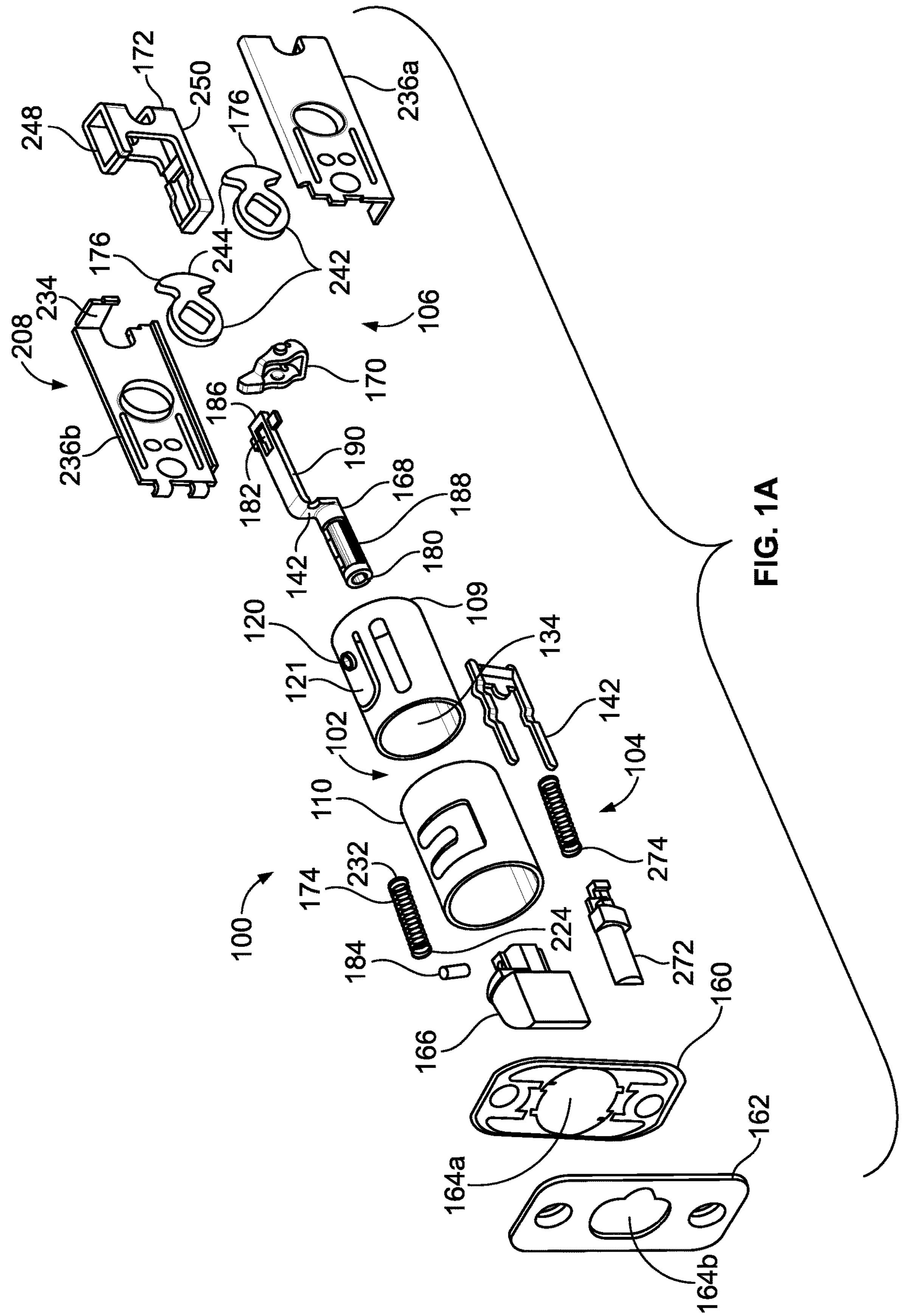
FIG. 1A illustrates a side perspective exploded view of a latch assembly according to an embodiment of the present application.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentalities shown in the attached drawings.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

FIGS. 1A-1E illustrate a latch assembly 100 and various associated components according to an embodiment of the present application. As shown, the latch assembly 100 can include a housing assembly 102, a dead latch assembly 104, and a bolt assembly 106. According to certain embodiments, the housing assembly 102 can include an outer housing 108 and an inner housing 109. The outer housing 108 can have a variety of shapes and sizes, including, but not limited to, a generally cylindrical shape. According to the illustrated embodiment, the outer housing 108 has an outer wall 110 having a generally circular cross-sectional shape that generally defines an interior region 112 of the outer housing 108. Further, according to such an embodiment, the outer wall 110 of the outer housing 108 can extend between a first opening 114 and a second opening 116.

The interior region 112 is configured to receive the insertion of at least a portion of the inner housing 109 through the first and/or second openings 114, 116 of the outer housing 108. Further, the interior region 112 of the outer housing 108 is configured to accommodate at least the partial rotational and axial displacement of the inner housing 109 within the interior region 112 of the outer housing 108. The outer wall 110 can further include an adjustment slot 118 that is adapted to receive the slideable displacement of an engagement member or detent 120 of the inner housing 109 as the latch assembly 100 is selectively adjusted between a first backset setting and a second backset setting. The adjustment slot 118 may have a variety of shapes and configurations. According to the illustrated embodiment, the adjustment slot 118 may include opposing first and second transversal slots **122*a*, 122*b* and an interconnected axial slot 124 that may, or may not, interconnect the first and second transversal slots 122*a*, 122*b*. Further, according to certain embodiments, the axial slot 124 may extend in a direction that is generally parallel to a longitudinal axis 126 of the outer housing 108, as shown, for example, in FIG. 1B. Additionally, according to certain embodiments, the first and second transversal slots 122***a*, 122*b* may be generally perpendicular to the axial slot 124 such that the adjustment slot 118 has a generally "U" shaped configuration. According to the illustrated embodiment, a first end 128 of the first transversal slot 122*a* can correspond to a first backset setting, such as, for example, a backset setting of 2⅜ inches, and a second end 130 of the second transversal slot 122*b* can correspond to a second backset setting, such as, for example, a backset setting of 2¾ inches.

The inner housing 109 includes an outer wall 132 that generally defines an inner region 134 of the inner housing 109. According to the illustrated embodiment, the inner housing 109 is generally cylindrical and extends between first and second openings 136, 138 that are located at opposing ends of the outer wall 132. The outer wall 132 of the inner housing 109 can also include one or more wall slots 140 that can accommodate displacement of other components of the latch assembly 100, including, for example, pivotal movement of a dead latch link 142, as discussed below. According to certain embodiments, the wall slots 140 can extend through the outer wall 132 so as to provide a passage between the inner region 134 of the inner housing 109 and a region outside of the inner housing 109. Additionally, according to certain embodiments, similar wall slots can extend through the outer wall 110 of the outer housing 108.

The outer wall 132 of the inner housing 109 can have a variety of different shapes and sizes. For example, in the illustrated embodiment, the outer wall 132 of the inner housing 109 has a generally cylindrical configuration. According to certain embodiments, the outer wall 132 of the inner housing 109 can include an engagement member 121 that can be displaced, deformed, deflected, and/or pivoted from a first position to a second position. In the illustrated embodiment, a pivot end 144 of the engagement member 121 is attached to an adjacent portion of the outer wall 132, while the remainder of the engagement member 121 is detached from adjacent portions of the outer wall 132. For example, in the illustrated embodiment, the engagement member 121 has a generally square or rectangular configuration that comprises a first pair of opposing sidewalls 146*a*, 146*b* and a second pair of opposing end walls 148*a*, 148*b*; one of the end walls 148*b* provides the pivot end 144, and the other end wall 148*a* and the sidewalls 148*a*, 148*b* are detached from adjacent portions of the outer wall 132. However, the engagement member 121 may have a variety of other shapes and configurations. Additionally, while in the illustrated embodiment the pivot end 144 is illustrated as a single, continuous portion or extension of the engagement member 121, according to other embodiments, the pivot end 144 can comprise one or more arms that provide pivot, deformation, deflection, or displacement points or portions of the engagement member 121 and/or of the outer wall 132. Additionally, the outer wall 132 can be constructed from a material, and/or have a wall thickness, that, when the engagement member 121 is subjected to a displacement force in a general direction toward the inner region 134, can accommodate the displacement or deformation of the engagement member 121 from the first position to the second position, as well as the general return of the engagement member 121 from the second position to, or around, the first position upon removal of the displacement force.

The engagement member 121 further includes the engagement projection 120, which generally extends outwardly from the engagement member 121. As discussed below in more detail, the engagement projection 120 is adapted to be received in the adjustment slot 118 of the outer housing 108. The engagement projection 120 may be positioned at a variety of locations along the engagement member 121. For example, as illustrated in at least FIG. 1A, the engagement projection 120 may be positioned on the engagement member 121 at or adjacent to the of the pivot end 144 of the engagement member 121.

When the housing assembly 102 is being assembled, the inner housing 109 can be positioned in the interior region 112 of the outer housing 108, and the engagement member 121 can be inwardly displaced, bent, or deformed from the first position to the second position. When at such a position, the engagement projection 120 can be positioned to not prevent at least a portion of the inner housing 109, including the engagement projection 120, from being inserted into the interior region 112 of the outer housing 108 to a location in which the engagement projection 120 can be received into the adjustment slot 118. Thus, upon reaching the adjustment slot 118, the displacement force exerted on the engagement member 121 may be removed so that the engagement member 121 can be displaced from the second position and to, or towards, the first position.

Accordingly, when the engagement projection 120 is positioned within the adjustment slot 118, the inner housing 109 can be linearly or rotatably displaced. Moreover, the relative angular and linear positions of the outer and inner housings 108, 109 can be adjusted such that the location of engagement projection 120 within the adjustment slot 118 can be adjusted, such as, for example, to accommodate the outer and inner housings 108, 109 being at relative positions that accommodate the first or second backset settings of the latch assembly 100. For example, according to the illustrated embodiment, the engagement member 121 of the inner housing 109 can be at, or around, the first end 128 of the first transversal slot 122*a* when the latch assembly 100 is at the first backset setting, such as, for example, a backset setting of 2⅜ inches. Similarly, the latch assembly 100 can be at the second backset setting, such as, for example, a backset setting of 2¾ inches, when the engagement projection 120 is at or around the second end 130 of the second transversal slot 122*b*. Further, while the degree to which the relative angular position of the outer and inner housings 108, 109 can vary depending on embodiments, according to certain embodiments, displacement of the engagement projection 120 from the first end 128 of the first transversal slot 122*a* and/or the second end 130 of the second transversal slot 122*b* to the axial slot 124, and vice versa, can be about +/−40 degrees, depending on the direction of displacement.

Figure 2A:
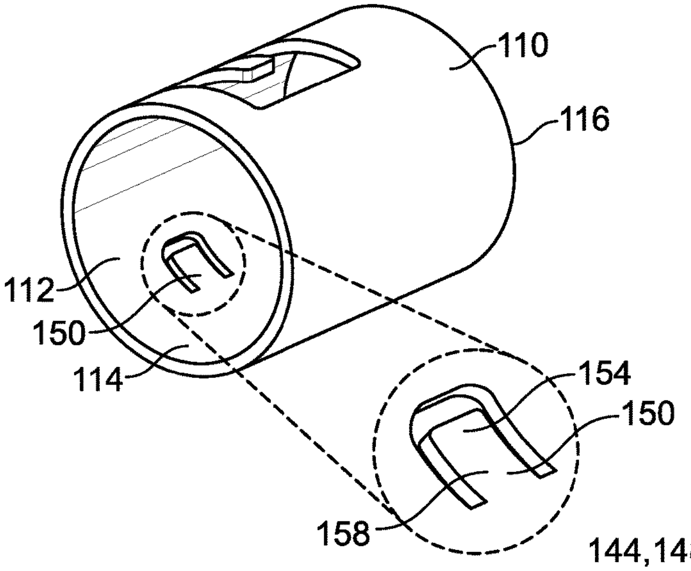
FIG. 2A illustrates a side perspective view of an embodiment of an outside housing of a housing assembly according to an embodiment of the present application.
Figure 2B:
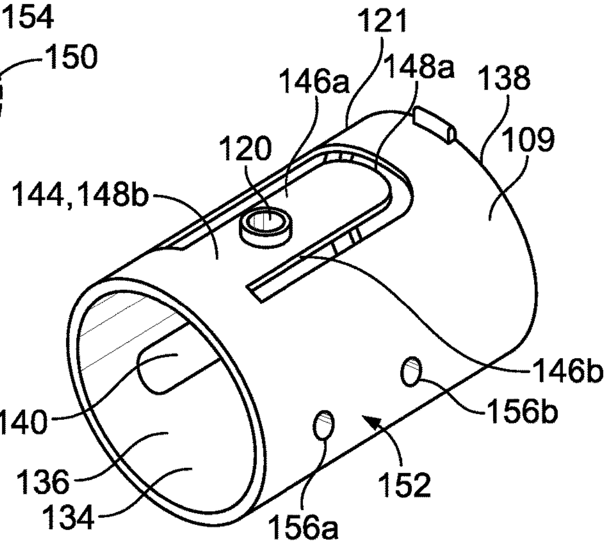
FIG. 2B illustrates a side perspective view of an embodiment of an inside housing of a housing assembly according to an embodiment of the present application.
Figure 2C:
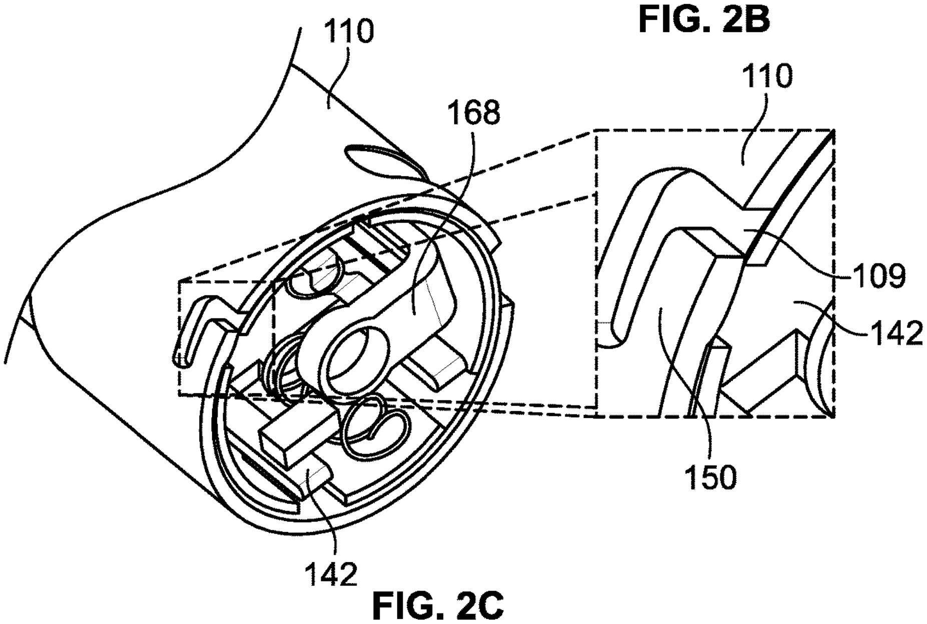
FIG. 2C illustrates a front side perspective, partial cutaway view of an engagement between first and second retention members of a housing assembly according to an embodiment of the present application.

Referencing FIGS. 2A-2C, according to certain embodiments, the outer housing 108 can include a first retention member 150 that is configured to selectively engage a second retention member 152 of the inner housing 109 in a manner that can at least assist in retaining the relative angular and linear positions of the outer and inner housings 108, 109. More specifically, according to the illustrated embodiment, such engagement between the first and second retention members 150, 152 can assist at least in retaining the housing assembly 102 at a position corresponding to the first or second backset settings. For example, according to the illustrated embodiment, at least a portion of the first retention member 150 can be positioned to engage at least a portion of the second retention member 152 when the engagement projection 120 is at, or around, the first end 128 of the first transversal slot 122*a*, and thus when the housing assembly 102 is at a corresponding position for the first backset setting, in a manner that resists subsequent relative displacement of the outer and inner housings 108, 109. Similarly, at least a portion of the first retention member 150 can be positioned to engage at least a portion of the second retention member 152 when the engagement projection 120 is at, or around, the second end 130 of the second transversal slot 122*b*, and thus when the housing assembly 102 is at a corresponding position for the second backset setting, in a manner that resists subsequent relative displacement of the outer and inner housings 108, 109.

According to certain embodiments, one of the first retention member 150 and the second retention member 152 can be a retention projection 154 that extends toward the other of the first and second retention members 150, 152. Further, according to such an embodiment, the other of the first and second retention members 150, 152, can be two or more apertures 156*a*, 156*b* in the outer wall 110, 132 of the associated outer or inner housing 109, 110 that are sized to selectively receive insertion of at least a portion of the retention projection 154. For example, FIG. 2A illustrates an embodiment of an outer housing 108 that includes a retention projection 154 that inwardly extends from the outer wall 110 of the outer housing 108. Further, according to the illustrated embodiment, the retention projection 154 can extend from a retention tab 158 that is pivotably connected to an adjacent portion of the outer wall 110 or otherwise deformable, displaceable, and/or deflectable. Additionally, as shown in FIG. 2B, according to the illustrated embodiment, the second retention member 152 can include a first aperture 156*a* and a second aperture 156*b* in the outer wall 132 of the inner housing 109. The first and second apertures 156*a*, 156*b* can be sized to receive insertion of at least a portion of the retention projection 154 in a manner that can at least assist in selectively securing the relative positions of the outer and inner housings 108, 109. Further, according to the illustrated embodiment, the first aperture 156*a* can be positioned along the outer wall 132 of the inner housing 109 such that at least a portion of the retention projection 154 is positioned within the first aperture 156*a* when the latch assembly 100 is at the first backset setting, and moreover, when the outer and inner housings 108, 109 are at relative positions associated with the first backset setting, as shown in FIG. 2C.

If the latch assembly 100 is to be adjusted to the second backset setting, a force applied to the latch assembly 100 can be provided that at least overcomes the interference or obstruction provided by the engagement between the retention projection 154 and the first aperture 156*a*. If such a force is provided, the retention projection 154 may slide out of, or otherwise be displaced from, the first aperture 156*a*, and engage an adjacent portion of the outer wall 132 of the inner housing 109, thereby causing the outward pivotable displacement, deformation, and/or deflection of the retention tab 158. In such a situation, when the outer and inner housings 108, 109 are placed at relative positions associated with the latch assembly 100 being at the second backset setting, the retention tab 158 may be inwardly displaced, deformed, and/or deflected as at least a portion of the retention projection 154 is received in the second aperture 156*b*. While the above example is discussed in connection with the latch assembly 100 being adjusted from the first backset setting to the second backset setting, a similar process can occur when the latch assembly 100 is adjusted from the second backset setting to the first backset setting.

According to certain embodiments, the inner housing 109 can be secured to a back plate 160 and/or face plate 162. The face plate 162 and the back plate 160 can each include openings 164*a*, 164*b* that are sized to accommodate the axial displacement of at least a portion of a latch bolt 166 of the bolt assembly 106 around a first end 210*a* of the latch assembly 100. Further, according to the illustrated embodiment, the opening 164*b* of the face plate 162 can be configured to prevent rotational displacement of the latch bolt 166 about the opening 164*b* of the face plate 162. Moreover, to the extent that the latch bolt 166 and/or the face plate 162 is/are rotatably displaced (i.e., when adjusting the backset setting of the latch assembly 100), the latch bolt 166 can engage, or be engaged by, at least a portion of an edge or wall of the opening 164*b* of the face plate 162 so that the latch bolt 166 and the face plate 162 are generally rotatably displaced together. Further, the back plate 160 can be operably secured to the face plate 162 (i.e., by a mechanical fastener such as a rivet, bolt, or screw, among other connectors) such that the back plate 160 may be rotatably displaced with the face plate 162.

The opening 164*a* of the back plate 160 can be sized to receive the slideable displacement of at least a portion of the latch bolt 166. Additionally, according to certain embodiments, the opening 164*a* of the back plate 160 can be sized to receive the insertion of at least a portion of the inner housing 109 and, according to certain embodiments, received a portion of the outer housing 108. The back plate 160 and the face plate 162 can also include one or more apertures that are sized to receive a fastener, such as, for example, a screw. When the latch assembly 100 is secured to an entryway device, such as, for example, a door, the back plate 160 can abut a side edge of the entryway device and/or be positioned within a recess in the side edge of the entryway device, among other locations.

According to the illustrated embodiment, the bolt assembly 106 includes a latch bolt 166, a latch bar 168, a multiplier link 170, a latch link 172, one or more bolt biasing elements 174, and one or more cams 176. The bolt assembly 106 is adapted to be axially displaced between an extended, locked position, and a retracted, unlocked position. As previously discussed, when in the extended, locked position, and with the entryway device in a closed position, the bolt assembly 106 can be axially positioned so that the latch bolt 166 at least partially extends into an adjacent wall, door frame, and/or strike plate, among other structures, so as to at least attempt to prevent the entryway device from being displaced to an open position. When in the retracted, unlocked position, the bolt assembly 106 may be axially positioned, such as, for example, being at least partially withdrawn in or toward the entryway device so that the latch bolt 166 does not prevent the entryway device from being displaced from the closed position to an open position.

Figure 11:
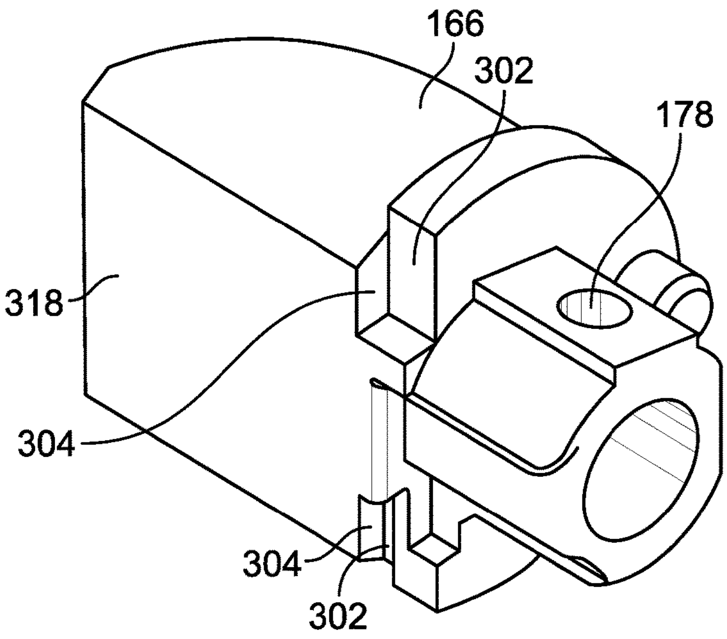
FIG. 11 illustrates a rear side perspective view of a latch bolt according to an illustrated embodiment of the present application.

The latch bar 168 may be operably secured to the latch bolt 166 in a number of different manners. For example, as shown in FIG. 11, according to the illustrated embodiment, the latch bolt 166 includes an orifice 178 that is sized to receive the insertion, and accommodate a degree of relative rotational displacement, of at least a first end 180 of the latch bar 168. Further, the latch bolt 166 may include an aperture 182 that is in communication with the orifice 178. According to such an embodiment, a bolt fastener 184 (such as, for example, a set screw or pin) may be positioned in the aperture 182 in a manner in which the bolt fastener 184 is selectively received in a portion of the latch bar 168 so as to at least secure the latch bar 168 within the orifice 178 of the latch bolt 166, as discussed below.

Figure 9A:
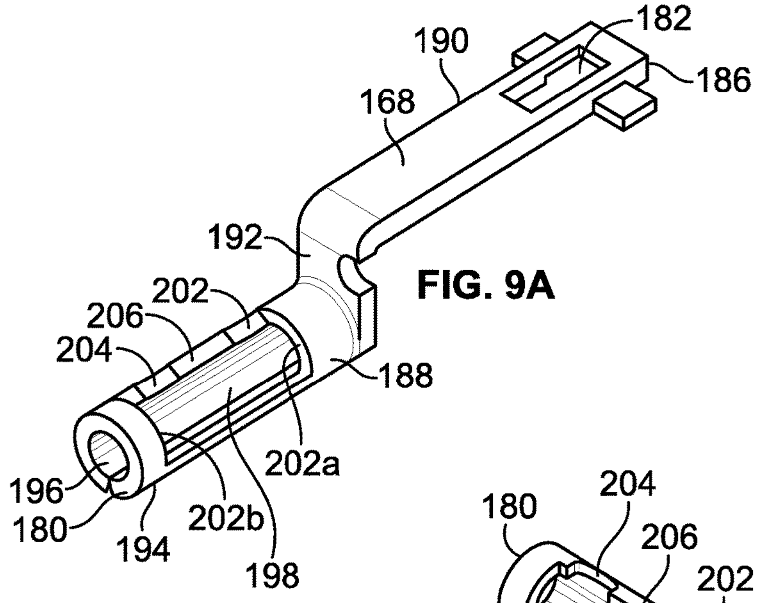
FIGS. 9A and 9B illustrate opposing side perspective views of a latch bar according to certain embodiments of the present application.
Figure 9B:
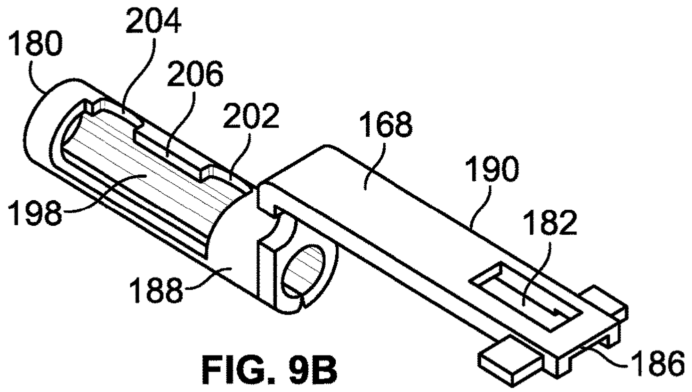

Referencing FIGS. 9A and 9B, according to certain embodiments, the latch bar 168 extends between the first end 180 and a second end 186. Further, the latch bar 168 can include a first body 188 and a second body 190, the first body 188 extending to the first end 180 and coupled to the second body 190 at a midsection 192 of the latch bar 168, the second body 190 extending to the second end 186. Further, according to the illustrated embodiment, the first body 188 can extend along a plane that is generally parallel to a plane along which the second body 190 extends. The first body 188 includes a first body wall 192 that generally defines an inner area 196 of the first body 188. According to the illustrated embodiment, the first body wall 192 is generally cylindrical in shape. Additionally, an adjustment recess 198 can extend through a portion of the first body wall 192, and axially extend between opposing first and second end walls 202*a*, 202*b*. The adjustment recess 198 includes a first retention recess 202 and a second retention recess 204, the first and second retention recesses 202, 204 extending into the first body wall 194 of the adjustment recess 198 and are each sized to receive at least a portion of the bolt fastener 184 in a manner that can prevent axial displacement of the bolt fastener 184. Further, the first retention recess 202 is positioned to receive, and at least assist in retaining the axial position of, the bolt fastener 184 when the latch assembly 100 is in one of the first and second backset settings. Similarly, the second retention recess 204 is positioned to receive, and at least assist in retaining the axial position of, the bolt fastener 184 when the latch assembly 100 is in the other of the first and second backset settings. Moreover, according to the illustrated embodiment, the first and second retention recesses 202, 204 can be separated by a shoulder 206 that prevents axial displacement of the bolt fastener 184 between the first and second retention recesses 202, 204. Thus, according to certain embodiments, one axial side of the first and second retention recesses 202, 204 can be along an adjacent side of the shoulder 206, while the opposing side of the first retention recess 202 can be along, or adjacent to the first end wall 202*a*, and the opposing side of the second retention recess 204 can be along, or adjacent to, the second end wall 202*b*.

Figure 1B:
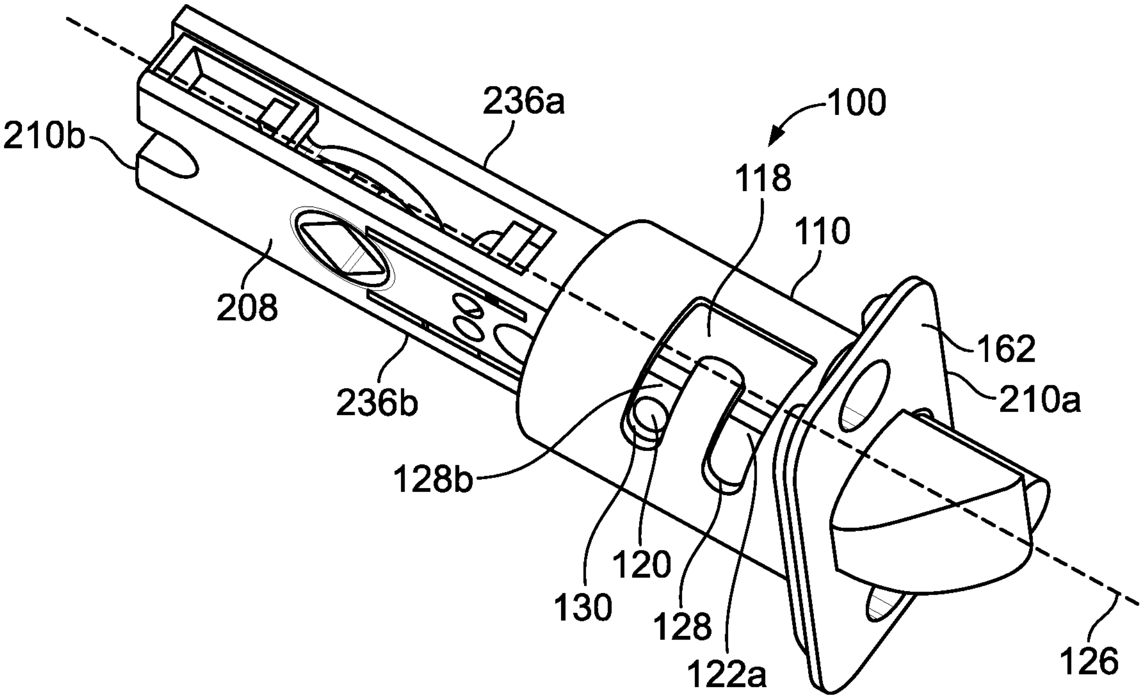
FIG. 1B illustrates a top side perspective view of the latch assembly shown in FIG. 1A.
Figure 1C:
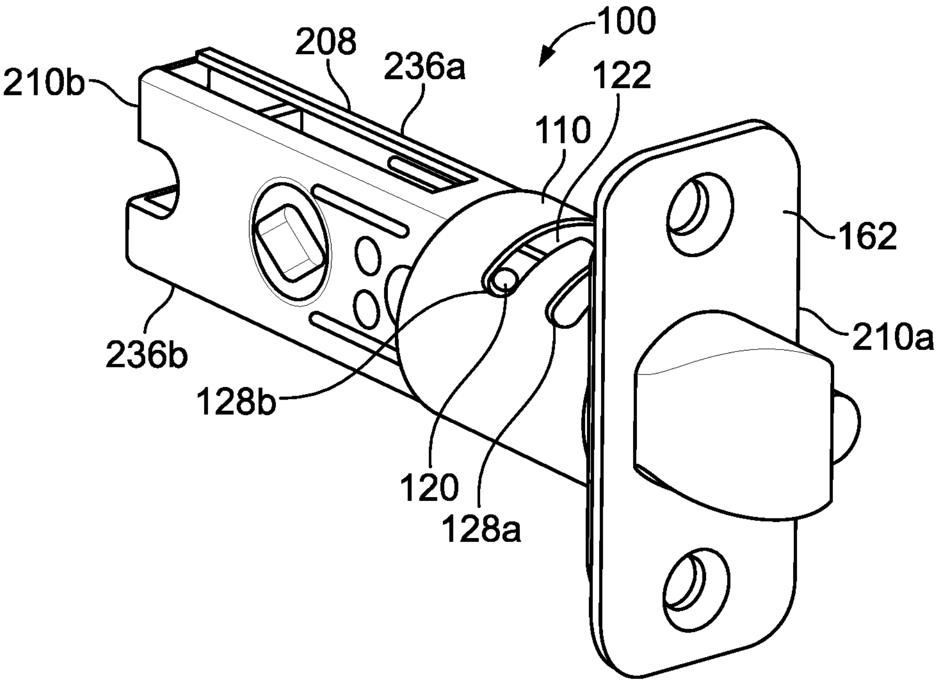
FIG. 1C illustrates a front side perspective view of the latch assembly shown in FIG. 1A.
Figure 1D:
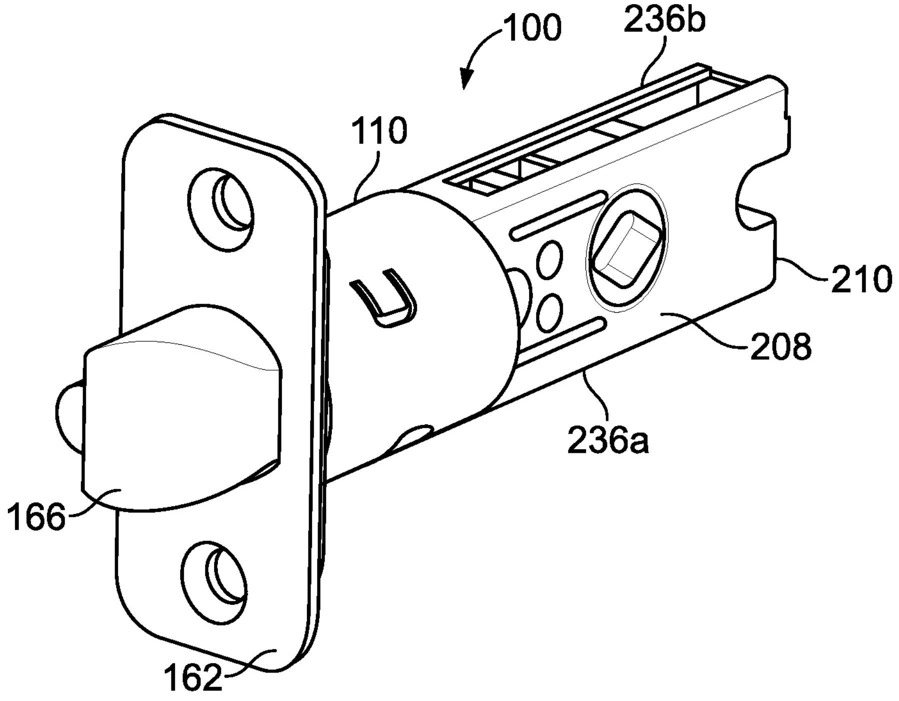
FIG. 1D illustrates a side perspective view of the latch assembly shown in FIG. 1A.
Figure 1E:
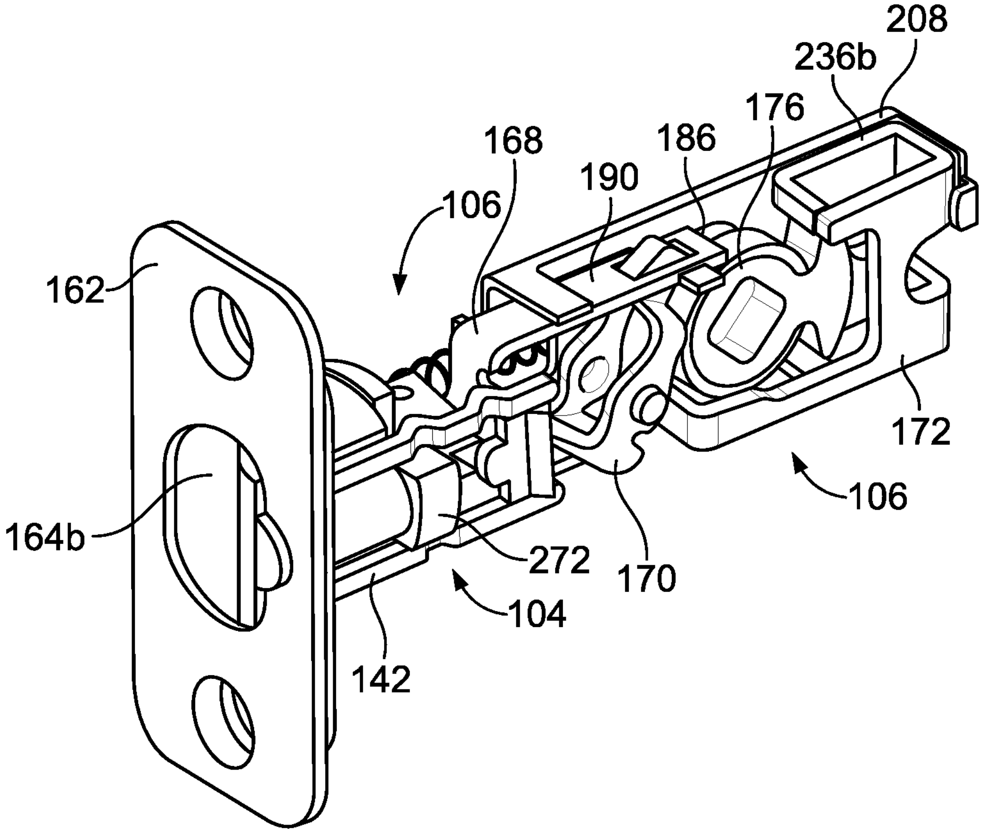
FIG. 1E illustrates a side perspective view of a portion of the latch assembly shown in FIG. 1D.

According to the illustrated embodiment, when the latch assembly 100 is at the second backset setting, as shown in at least FIG. 1B, the engagement projection 120 is positioned at the second end 130 of the second transversal slot 122*b*. In such a situation, the bolt fastener 184 extends from the orifice 178 of the latch bolt 166 and into the second retention recess 204. According to such an embodiment, axial displacement of the latch bar 168 can be translated to the latch bolt 166 via engagement between the second retention recess 204 and the bolt fastener 184, and/or vice versa. If however, the latch assembly 100 is to be adjusted to the first backset setting, according to certain embodiments, the inner housing 109 is coupled to the face plate 162 and/or back plate 160 such that application of a rotational force to the face plate 162 and/or back plate 160 in a first rotation direction can facilitate a change in the relative angular positions of the outer and inner housings 108, 109. According to such an embodiment, such a change in the relative angular positions of the outer and inner housings 108, 109 can result in the engagement projection 120 being displaced along the second transversal slot 122*b* until the engagement projection 120 reaches the axial slot 124. Further, as previously discussed, according to the illustrated embodiment, changes in the relative angular positions of the outer and inner housings 108, 109 can also result in disengagement between the retention projection 154 of the outer housing 108 from the second aperture 156*b* of the inner housing 109.

Figure 9C:
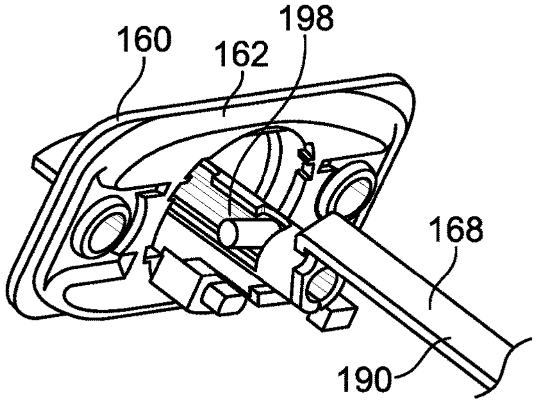
FIG. 9C illustrates a rear side perspective view of a portion of a latch assembly with a bolt fastener in an adjustment recess and adjacent to a first retention recess.
Figure 9D:
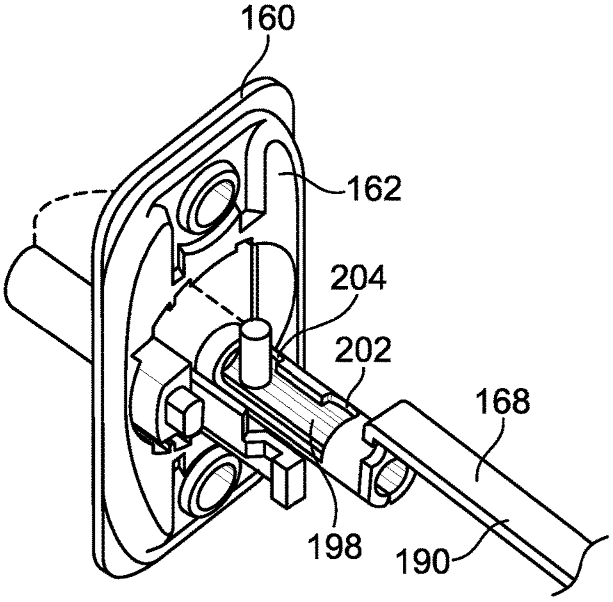
FIG. 9D illustrates a rear side perspective view of a portion of a latch assembly with a bolt fastener in a second retention recess.

With the latch bolt 166 extending through the face plate 162 and/or the back plate 160, rotational displacement of the face plate 162 and/or back plate 160 in the first rotation direction can facilitate similar rotation of the latch bolt 166, and, moreover, can result a change in the relative angular positions of the latch bolt 166 and the latch bar 168. Further, such an adjustment in relative angular positions of at least the latch bolt 166 and the latch bar 168 can result in the bolt fastener 184 being displaced from the second retention recess 204 and to a position in the adjustment recess 198 that is adjacent to the second retention recess 204, as shown, for example, in FIG. 9C. The bolt fastener 184 and the latch bolt 168 can then be in a position at which the shoulder 206 does not preclude a change in the axial position of the bolt fastener 184 in the adjustment recess 198. Further, according to the illustrated embodiment, such positioning of the bolt fastener 184 in the adjustment recess 198 can correspond to the engagement projection 120 being at the intersection of the second transversal slot 122*b* and the axial slot 124.

In certain embodiments, with the bolt fastener 184 in the adjustment recess 198 near the second retention recess 204, the bolt biasing element can exert a force against the latch bolt 166 that seeks to bias the latch bolt 166 in an axial direction toward the first retention recess 202 while the second body 190 of the latch bar 168 can be coupled to a cover housing 208 at a second end 210*b* of the latch assembly 100. According to such an embodiment, the relative axial positions of at least the face plate 162 and/or the back plate 160 and the cover housing 208 and/or the outer housing 108 may be adjusted such that the axial distance between the first and second ends 210*a*, 210*b* of the latch assembly 100 is reduced. Such an adjustment of axial positions can facilitate an adjustment in the relative axial positions of the outer and inner housings 108, 109 such that the engagement projection 120 is axially displaced along the axial slot 124 generally to the intersection of the axial slot 124 and the first transversal slot 122*a*. Additionally, such an axial adjustment can facilitate adjustment of the relative axial positions of the latch bolt 166 and the latch bar 168 such that the bolt fastener 184 is positioned within the adjustment recess 198 at a location that is adjacent to the first retention recess 202.

The face plate 162 and/or back plate 160 can then be rotatably displaced in a second rotation direction that is opposite of the first rotation direction. Such rotational displacement in the second rotation direction can facilitate a change in the relative angular positions of the outer and inner housings 108, 109 such that the engagement projection 120 is displaced from the axial slot 124 and along the first transversal slot 122*a* until the engagement projection 120 reaches the first end 128 of the first transversal slot 122*a*. Additionally, such rotation of the face plate 162 and/or back plate 160 in the second rotation direction can facilitate similar rotational displacement of the latch bolt 166, which can result in the bolt fastener 184 being displaced into the first retention recess 202. Further, as previously discussed, according to the illustrated embodiment, changes in the relative angular positions of the outer and inner housings 108, 109 can also result in engagement between the retention projection 154 of the outer housing 108 from the first aperture 156*a* of the inner housing 109 that can at least assist in retaining the relative positions of the outer and inner housings 108, 109.

Figure 12A:
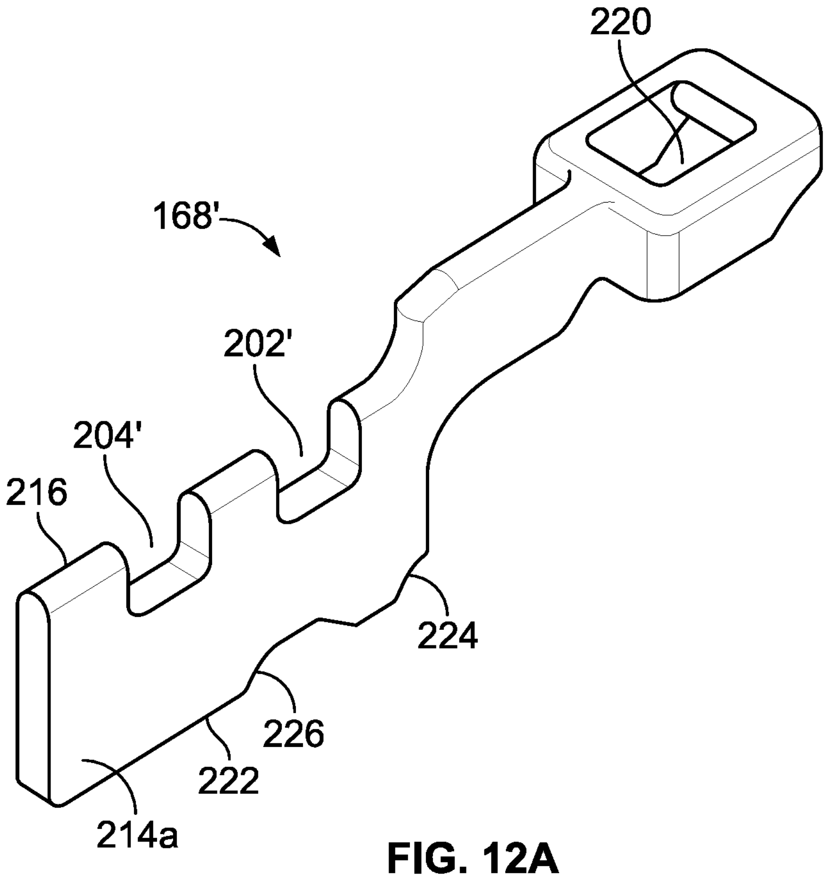
FIGS. 12A and 12B illustrate opposing side perspective views of a latch bar according to certain embodiments of the present application.
Figure 12B:
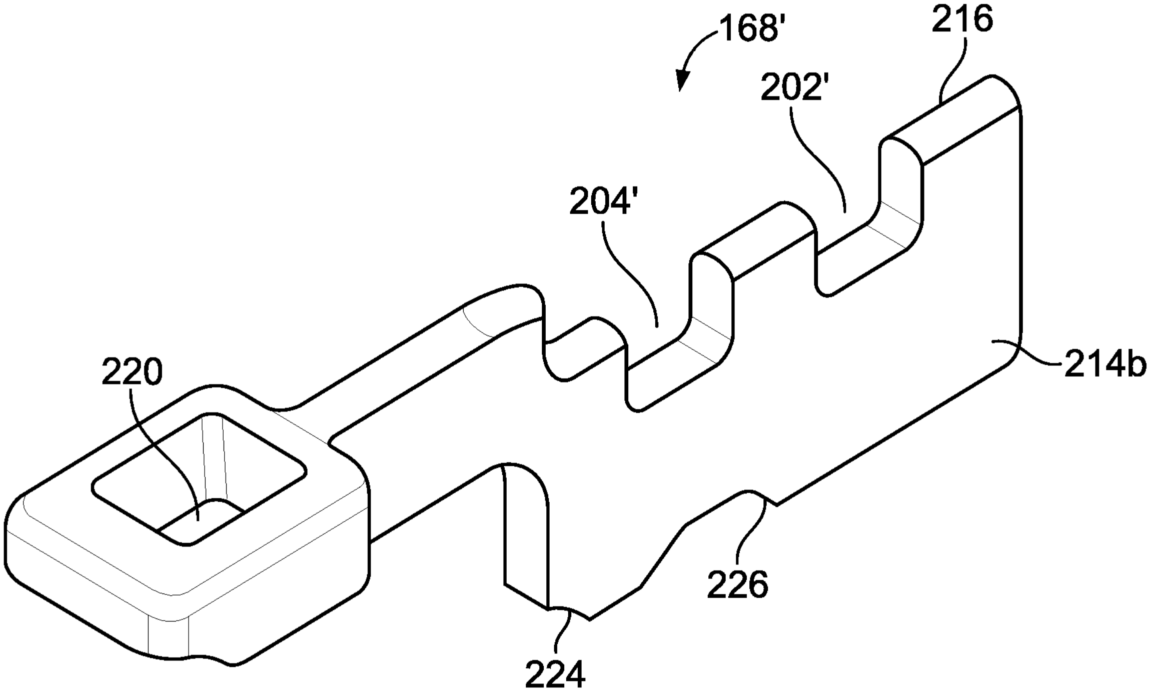

FIGS. 12A and 12B illustrate an alternative embodiment in which the latch bar 168' is relatively flat in shape. The latch bar 168' has a first section 212 that extends across a relatively narrow distance between generally flat opposing sidewalls 214*a*, 214*b* of the first section 212. Further, similar to the embodiment illustrated in FIGS. 9A and 9B, a top wall 216 of the first section 212 can include first and second retention recesses 202', 204' that selectively receive the bolt fastener 184 in connection with the first and second backset settings. Further, a bottom wall 222 of the first section 212 can include a first abutment surface 224 and a second abutment surface 226, which can be used in connection with a dead-latch feature, as discussed below. Additionally, according to both embodiments of the latch bar 168, 168', a second portion 218, 218' of the latch bar 168, 168' also includes an opening 220 that can be sized to receive a portion of a multiplier link 170, as discussed below.

Figure 12C:
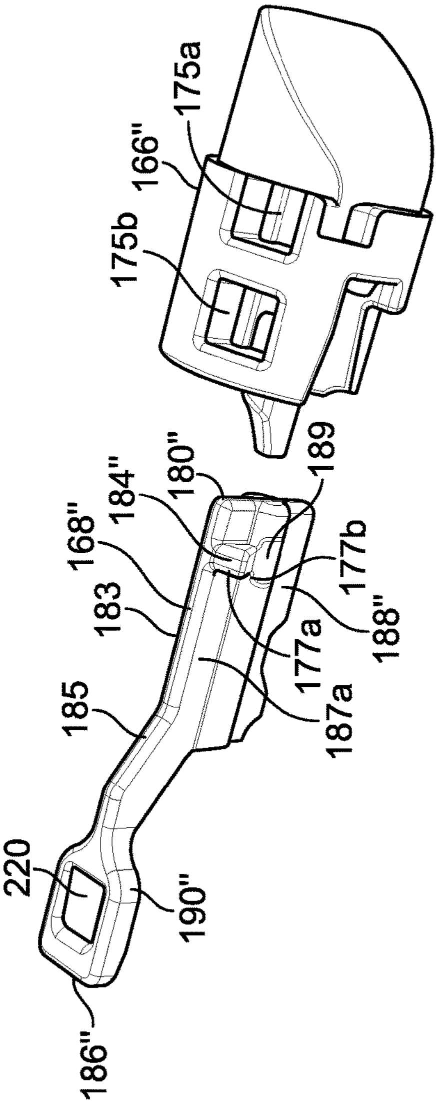
FIG. 12C illustrates a top side perspective view of a latch bar and a latch bolt according to certain embodiments of the present invention.
Figure 12E:
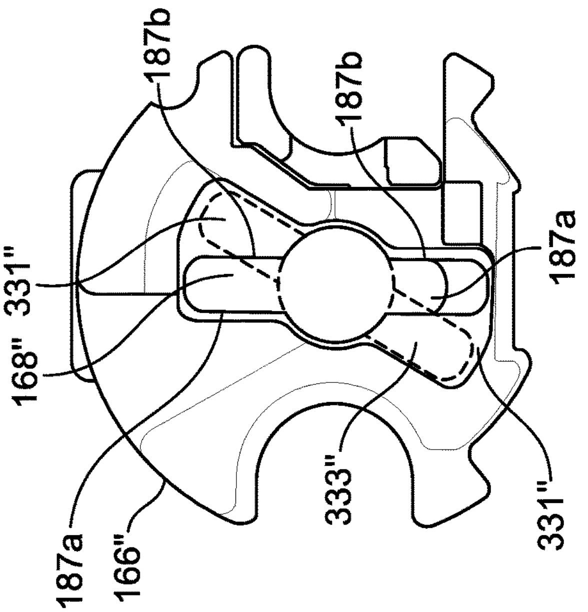
FIG. 12E illustrates a cross sectional view of the latch bar and latch bolt taken along line A-A in FIG. 12D.
Figure 12D:
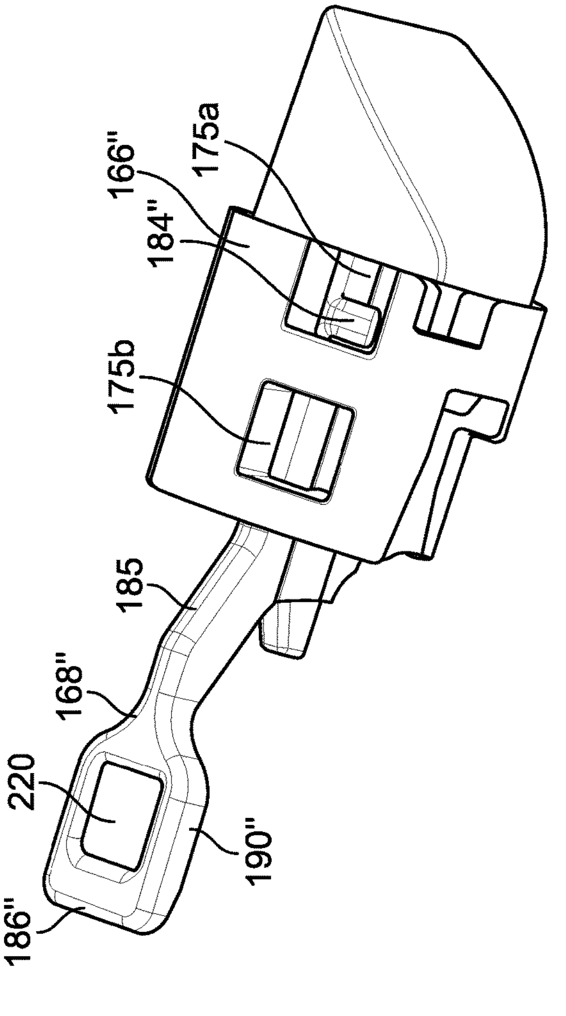
FIG. 12D illustrates a top side perspective view of the latch bar and latch bolt shown in FIG. 12C in a first of two relative backset positions.
Figure 13A:
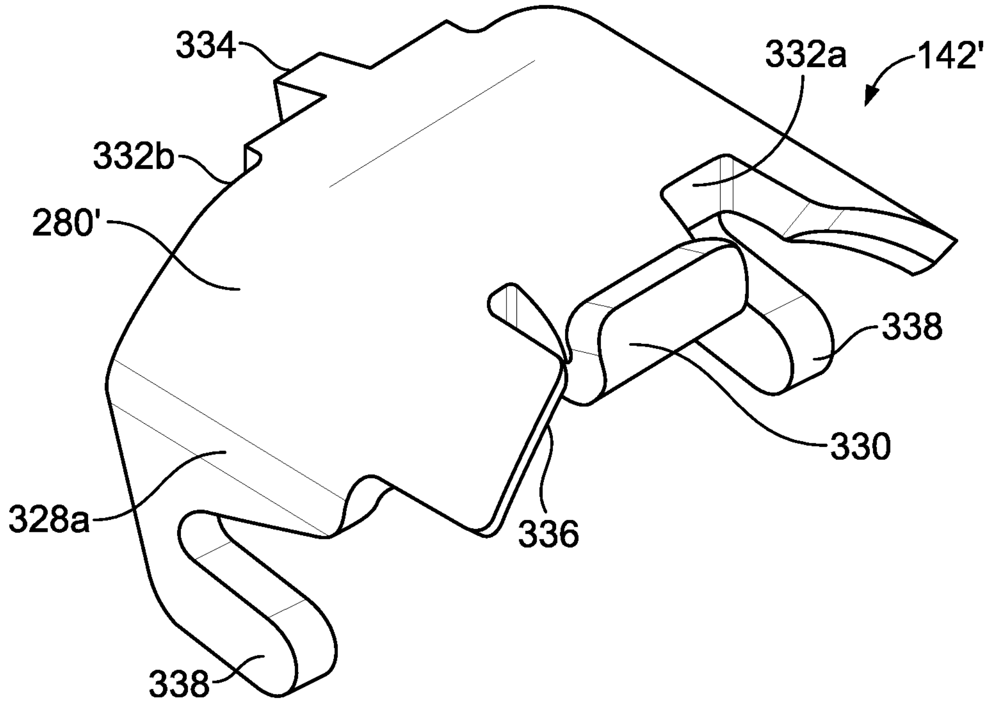
FIGS. 13A and 13B illustrate opposing side perspective views of a dead latch link according to certain embodiments of the present application.
Figure 13B:
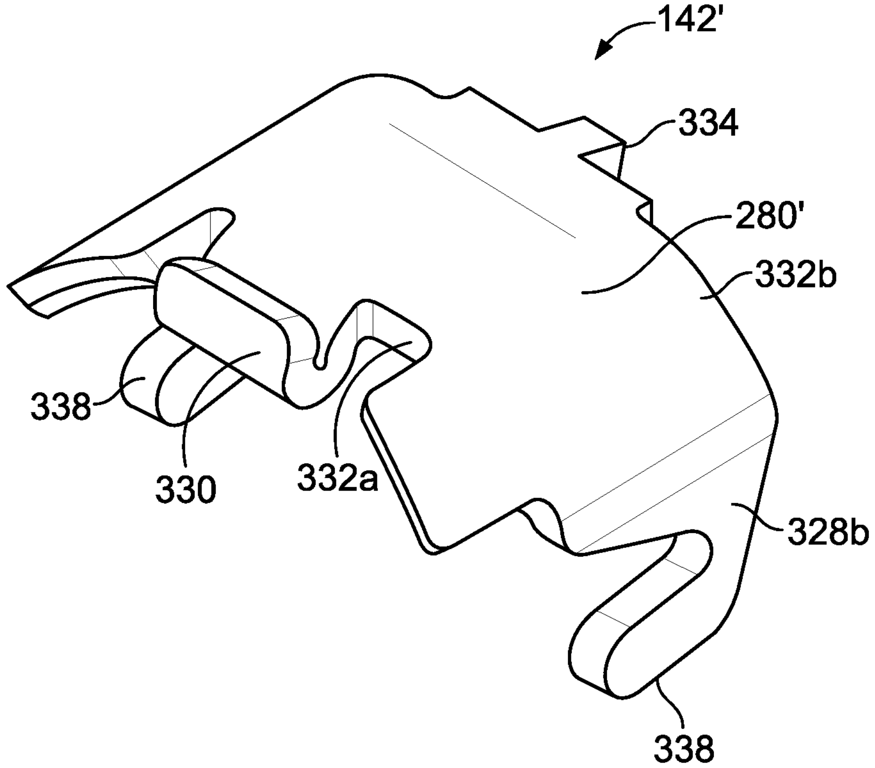
Figure 14A:
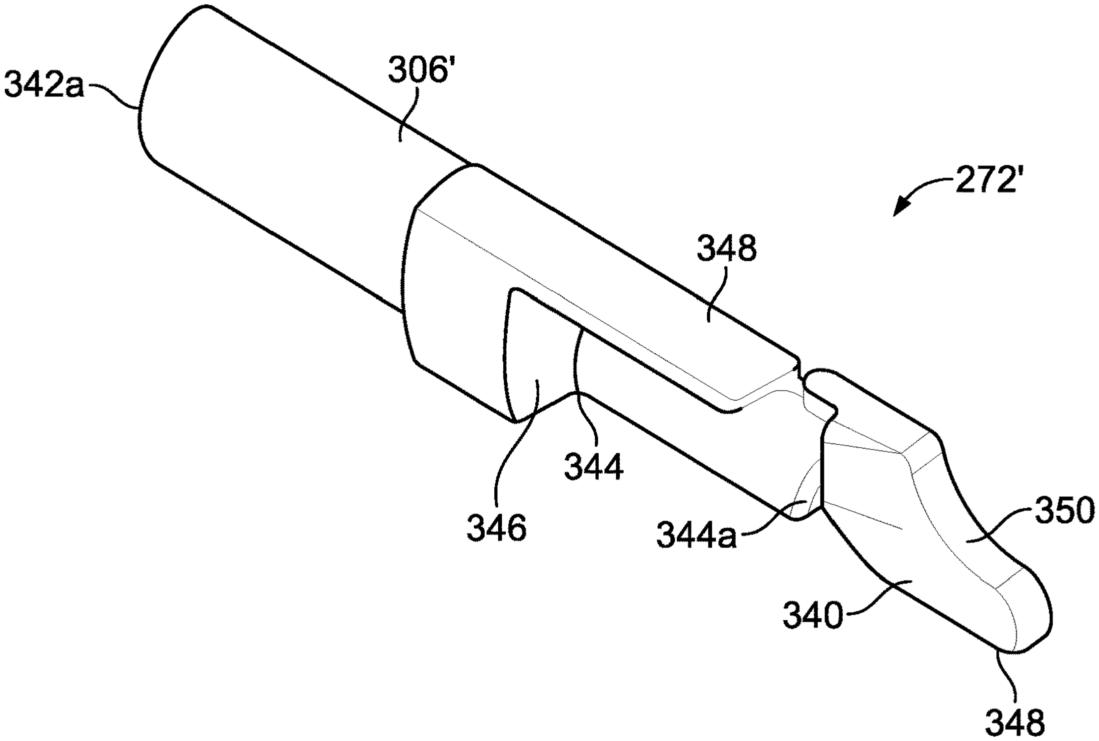
FIGS. 14A and 14B illustrate opposing side perspective views of a latch bar according to certain embodiments of the present application.
Figure 14B:
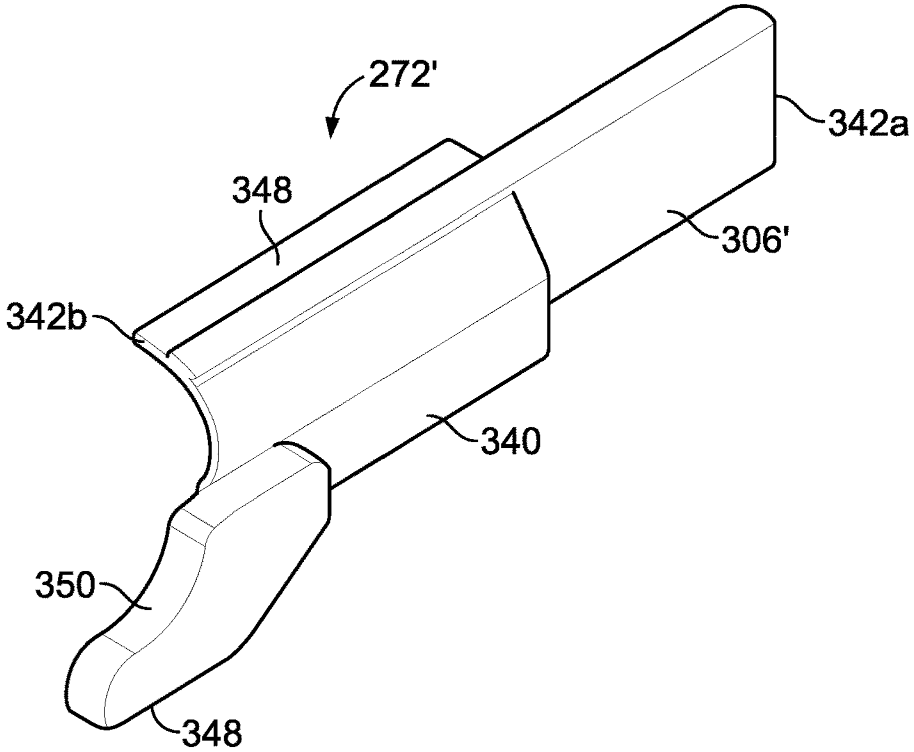

FIGS. 12C-12E illustrate top side perspective views of a latch bar 168" and latch bolt 166" according to certain embodiments of the present application. The latch bar 168" can include a first body 188" and a second body 190". The first body 188" extends to the first end 180" and is coupled to the second body 190" at a midsection 192" of the latch bar 168", and the second body 190" extends to the second end 186". According to the illustrated embodiment, the latch bar 168" includes an angled arm section 185 configured to locate at least the opening 220 that can be sized to receive a portion of a multiplier link 170 at a different height or plan than the first body 188". Additionally, according to the illustrated embodiment, the portion of the second body 190" that is at least positioned about the opening 220 can generally have a flat or planar configuration that has an orientation that is generally orthogonal to the orientation of the first body 188".

The first body 188" of the latch bar 168" can generally extend along a pair of opposing sidewalls 187*a*, 187*b*. In the illustrated embodiment, at least one of the sidewalls 187*a*, 187*b*, such as, for example, a first sidewall 187*a*, can include a projection or fastener 184" that extends away from at least a portion of the first sidewall 187*a*. According to the illustrated embodiment, the projection is generally defined by a first wall 177*a* and a second wall 177*b* that are generally oriented in divergent directions relative to each other. The projection 184" can be positioned at a variety of locations along the first body 188". For example, according to the illustrated embodiment, the projection 184" can be toward the first end 180" of the first body 188" and in generally close proximity to, or extend from, an upper wall 183" of the first body 188". Further, the first side 187*a* can include a recess 189 that can provide a clearance that is sized to prevent interference between the latch bar 168" and the bolt 166" in the adjacent area around the projection 184".

According to the embodiment shown in FIGS. 12C-12E, the latch bolt 166" includes a first retention recess 175*a* and a second retention recess 175*b*. The first and second retention recesses 175*a*, 175*b* of the latch bolt 166" are sized to receive selective placement of, and generally retain, the projection 184" when the associated latch assembly 100 is in the first and second backset setting respectively. Moreover, the first and second retention recesses 175*a*, 175 are axially positioned or separated so as to accommodate placement of the projection 184" when the latch assembly 100 is at the corresponding first and second backset settings. Further, as shown in at least FIG. 12E, according to certain embodiments, the latch bolt 166" includes a aperture 333" that is sized to received insertion of the latch bar 168", as well as accommodate changes in the relative angular positions of the latch bolt 166' and latch bar 168' when, and if, the backset setting is adjusted. For example, according to the illustrated embodiment, the aperture 333" of the latch bolt 166" is shaped to accommodate adjustment in the angular orientation in a first direction such that the position of the latch bar 168" can be changed from a first position, as shown in solid lines in FIG. 12E, to a second position, as shown in dashed lines in FIG. 12E. Thus, to accommodate such displacement, according to the depicted embodiment, the aperture 333" can have extensions 331" on opposing sides of the aperture 333" relative to a midpoint 337 of the aperture 333". The extensions 331" are sized to accommodate temporary placement of at least a portion of the first body 188" of the latch bar 168" as the projection 184" is displaced toward/away from at least one of the first and second retention recesses 175*a*, 175*b*.

According to certain embodiments, the bolt biasing element 174 may exert a biasing force that biases the latch bolt 166 to the extended, locked position. According to the illustrated embodiment, a first end 227 of the bolt biasing element 174 may exert a force against a backside 228 of the latch bolt 166. Further, according to certain embodiments, at least a portion of the bolt biasing element 174 around the first end 226 can be positioned about a hub 230 that extends from a backside 228 of the latch bolt 166 that can at least assist in retaining a position of the bolt biasing element 174. Further, a second end 232 of the bolt biasing element 174 can abut against a back wall 234 at the second end 232 of the outer housing 108.

Figure 5A:
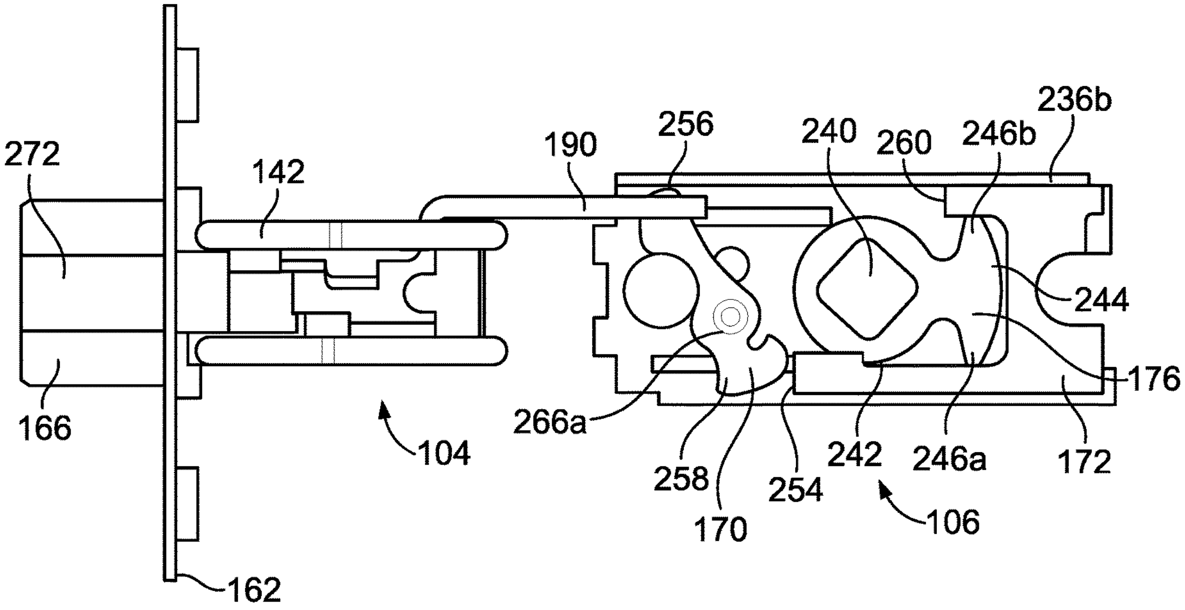
FIG. 5A illustrates a side view of a portion of a latch assembly in which a multiplier link of a bolt assembly is at an extended first position and a latch bolt is at an extended first position.
Figure 5B:
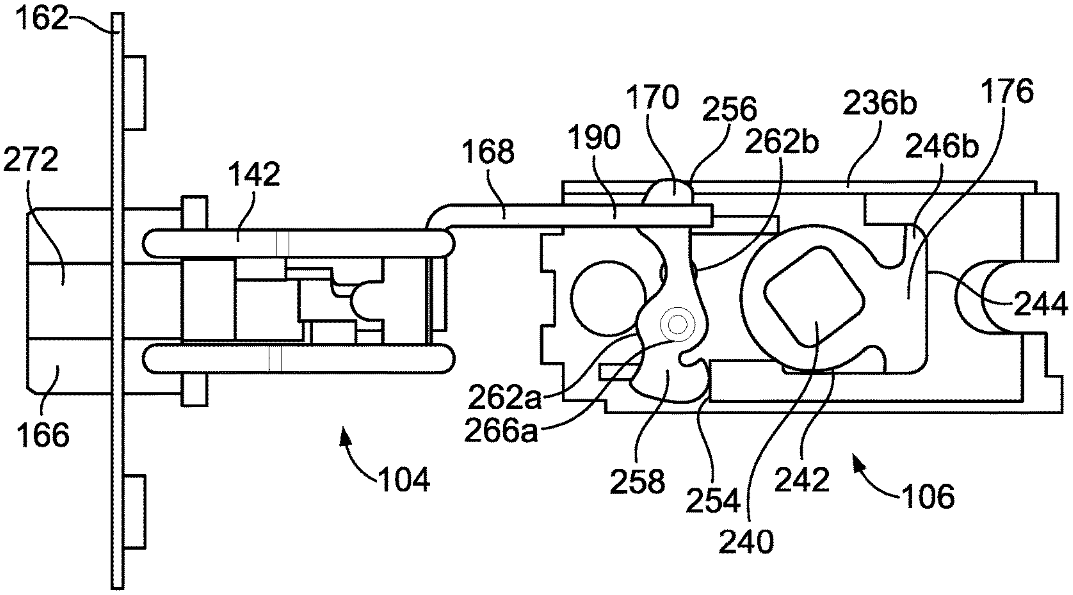
FIG. 5B illustrates a side view of a portion of the latch assembly shown in FIG. 5A in which the multiplier link is at an intermediate position as the latch bolt is being displaced toward a retracted position.
Figure 5C:
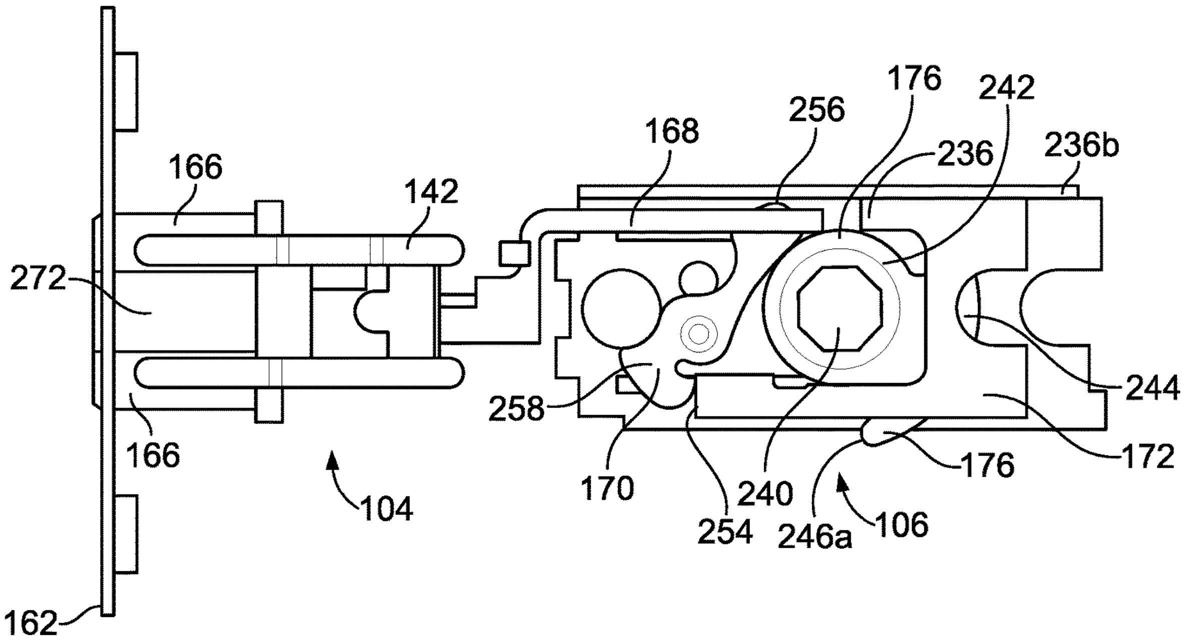
FIG. 5C illustrates a side view of a portion of the latch assembly shown in FIG. 5A in which the multiplier link and the latch bolt are at corresponding retracted second positions.

Referencing FIGS. 5A-5D, as discussed below in more detail, displacement of the latch bolt 166 from the extended, locked position to the retracted, unlocked position can involve rotation of one or more the cams 176 of the bolt assembly 106 in a first direction, which can be provided by rotation of a drive shaft(s) that is/are coupled to a doorknob or lever that is manipulated (e.g., rotated, turned, or twisted) by an individual who may be seeking to displace the associated entryway device. According to the illustrated embodiment, the rotational force provided by rotation of the doorknob or lever, and the resulting rotation of the cam(s) 176 in the first direction, may have to overcome at least the biasing force of the bolt biasing element 174. Such rotation of one or more of the cams 176 can facilitate the axial displacement of the latch link 172 in a direction generally toward the first end 210*a* of the latch assembly 100. Further, such linear displacement of the latch link 172 can cause the latch link 172 to engage a multiplier link 170, and moreover exert a force that causes the multiplier link 170 to be rotatably displaced in a first direction from an extended first position (FIG. 5A), and proceed through intermediate positions (FIG. 5B) before reaching a retracted second position (FIG. 5C). Additionally, as the multiplier link 170 is rotatably displaced to the retracted second position, the multiplier link 170 can exert a force against a portion of the latch bar 168 that linearly displaces the latch bar 168, and thus the latch bolt 166, generally toward the second end 210*b* of the latch assembly 100, and moreover, to the associated unlocked, retracted position.

Upon removal of the force(s) that rotatably displaced the doorknob or lever, and thus was used to rotate the cam(s) 176 in the first direction, the biasing force of the bolt biasing element 174 can facilitate the return the latch bolt 166 from the unlocked, retracted position, to the locked, extended position. According to the illustrated embodiment, as the latch bolt 166 can be coupled to the latch bar 168 via the bolt fastener 184 extending from the latch bolt 166 and into the first or second retention recess 202, 204, such axial displacement of the latch bolt 166 can result in similar axial displacement of the latch bar 168. Further, as the latch bar 168 is axially displaced generally in a direction toward the first end 210*a* of the latch assembly 100, the latch bar 168 can exert a force against the multiplier link 170 that facilitates the rotation of the multiplier link 170 in a second rotational direction that is opposite of the first rotational direction. For example, the multiplier link 170 can be rotatably displaced in the second direction such that the multiplier link 170 is rotated from the retracted second position (FIGS. 5C and 5D), to the extended, locked position (FIG. 5A).

According to the illustrated embodiment, the latch assembly 100 can include two split cams 176, one cam 176 being adjacent to a first side portion 236*a* of the cover housing 208 and another cam 176 being adjacent to an opposing second side portion 236*b* of the cover housing 208. The use of a pair of split cams 176 can assist the latch assembly 100 in resisting twist load on a spindle when first and second doorknobs or levers that are on opposing sides of the latch assembly 100 are both rotated in opposite directions.

Figure 4A:
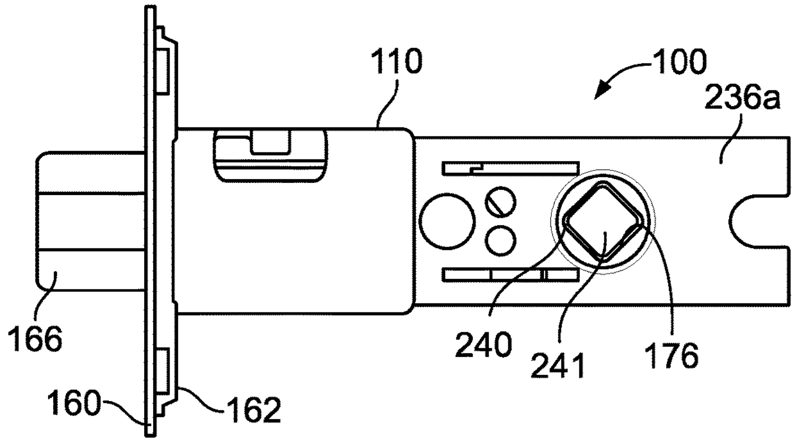
FIG. 4A illustrates a side view of a latch assembly at a first backset setting according to an illustrated embodiment of the present application.
Figure 5D:
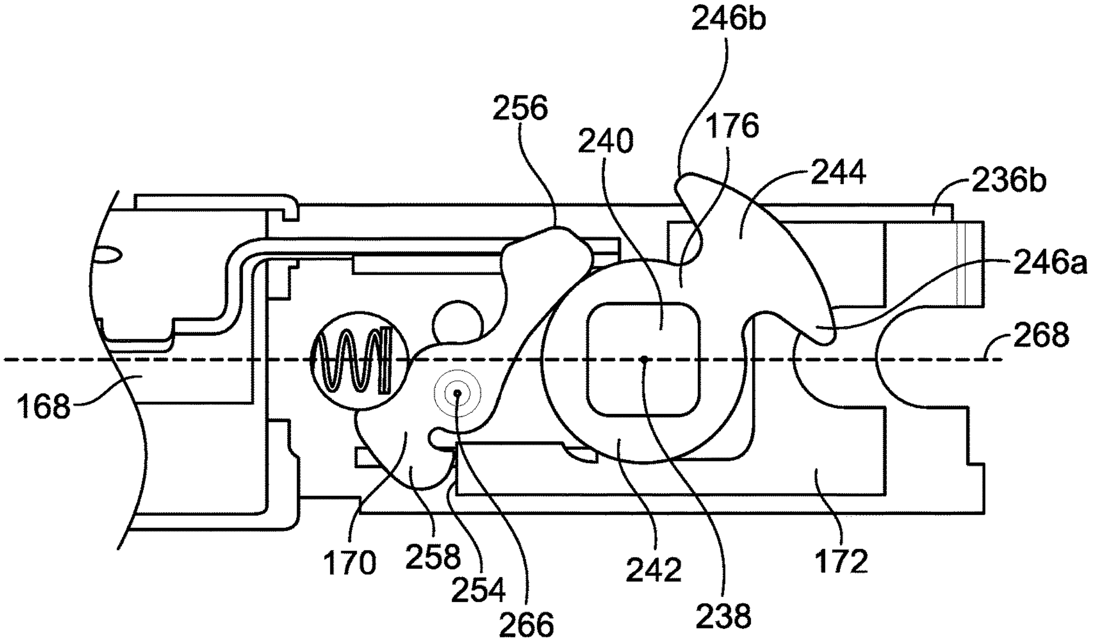
FIG. 5D illustrates a side view of a portion of the latch assembly shown in FIG. 5C.

According to certain embodiments, the cams 176 can each be configured to be positioned about an inwardly extending hub of the corresponding first and second side portions 236*a*, 236*b* of the cover housing 208, which can at least assist in guiding the rotational displacement of the cams 176 about a cam axis 238 (FIG. 5D). Further, each cam 176 can include an aperture 240 that matingly receives insertion of a driver or driver element 241 (FIG. 4A) that is coupled, directly or indirectly, to the lever or doorknob. Further, according to the illustrated embodiment, the aperture 240 of the cam 176, and the corresponding portion of the driver or driver element 241 that engages the cam 176, can both be non-circular in shape so as to at least facilitate the transmission or rotational forces between the driver or driver element 241 and the cam 176. Additionally, according to certain embodiments, one cam 176 can receive a driver or driver element 241 that is coupled to a first handle, such as, for example, an interior handle, and the other cam 176 can receive the driver or driver element 241 that is coupled to a second handle, such as, for example, an exterior handle. According to such an embodiment, which cam 176 is rotated can be based on whether the associated driver or driver element 241, and moreover, whether the corresponding first or second handle is being rotated.

Each cam 176 can include a body portion 242 and a foot portion 244. According to the illustrated embodiment, the body portion 242, through which the aperture 240 of the cam 176 extends, can have a generally circular, cylindrical, and/or ring shape, among other shapes. The foot portion 244 can outwardly extend from the body portion 242, and include a first side 246*a* and a second side 246*b*. Further, the first side 246*a* and/or the second side 246*b* of the foot portion 244 can be structured to extend to a position in which the first side 246*a* and/or the second side 246*b* of the foot portion 244 can selectively engage the latch link 172, as discussed below, as well as not interfere with the rotational displacement of the multiplier link 170.

Figure 10A:
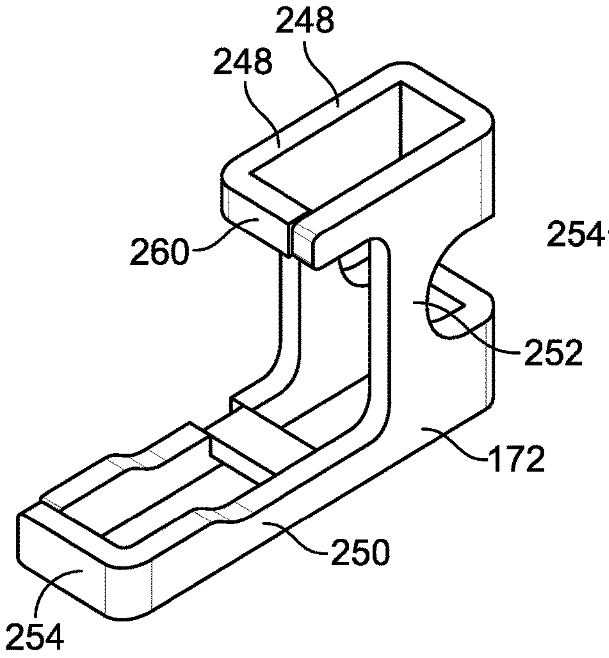
FIGS. 10A and 10B illustrate opposing side perspective views of a latch link according to certain embodiments of the present application.
Figure 10B:
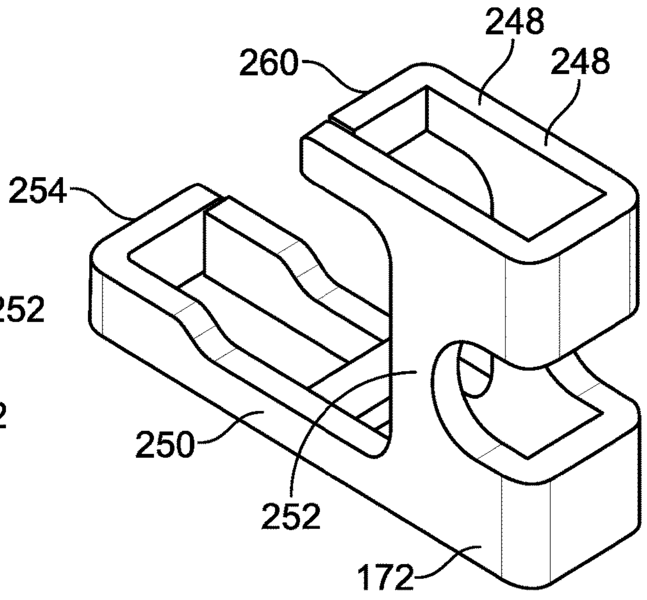

Referencing FIGS. 10A and 10B, the latch link 172 can have an upper segment 248 and a lower segment 250 that are interconnected by, and extend away from, a rear section 252. According to certain embodiments, a lower end wall 254 of the lower segment 250 may be at a greater distance from the rear segment 252 than a corresponding upper end wall 256 of the upper segment 248. As discussed below in more detail, such a design can allow the lower segment 250 to contact a lower segment 250 of the multiplier link 170 in a manner that rotates an upper section 256 of the multiplier link 170 toward the latch link 172 without the upper segment 248 of the latch link 172 interfering with such rotational displacement.

As discussed below, rotation of one or both of the cams 172 in the first rotational direction can result in the foot portion 244 of the cam(s) 172 contacting the lower segment 250 of the latch link 172 in a manner that facilitates linear displacement of the latch link 172 in a first direction generally toward the first end 210*a* of the latch assembly 100. Such linear displacement of the latch link 172 can facilitate a the lower end wall 254 of the latch link 172 exerting a pushing or pulling force on at least a lower section 258 of the multiplier link 170 that facilitates the rotation of the multiplier link 170 in the first rotational direction. Further, the second body 190 of the latch bar 168 can be coupled to the upper section 256 of the multiplier link 170, such as, for example, via insertion of at least a portion of the upper section 256 of the multiplier link 170 in the aperture 193 of the latch bar 168. According to such an embodiment, rotation of the multiplier link 170 can facilitate the upper section 256 of the multiplier link 170 exerting a pushing or pulling force that linearly displaces the latch bar 168, and thus the latch bolt 166, in a second direction generally toward the second end 210*b* of the latch assembly 100, thereby displacing the latch bolt 166 from the extended position and toward, and/or to, the retracted position.

According to certain embodiments, the lower sections 258 of the multiplier link 170 include one or more curved or inclined surfaces that engage mating curved or inclined surfaces of the lower end wall 254 of the latch link 172 and the portions of the latch bar 168 that generally define the aperture 182 of the latch bolt 168 in a manner that, at least when the latch bolt 166 is being displaced from the extended position, facilitates the translation of linear movement of the latch link 172 to rotational displacement of the multiplier link 170, and rotational displacement of the multiplier link 170 to linear displacement of the latch bar 168.

Figure 7A:
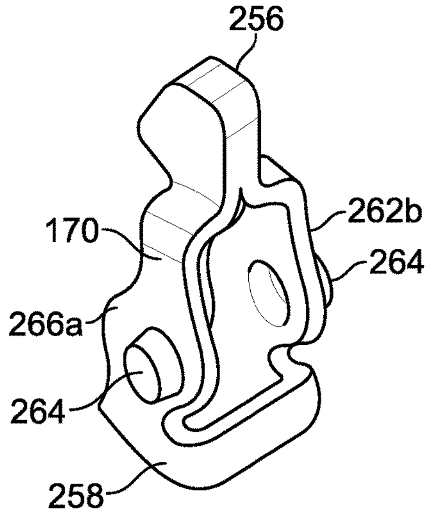
FIGS. 7A and 7B illustrate opposing side perspective views of a multiplier link according to certain embodiments of the present application.
Figure 7B:
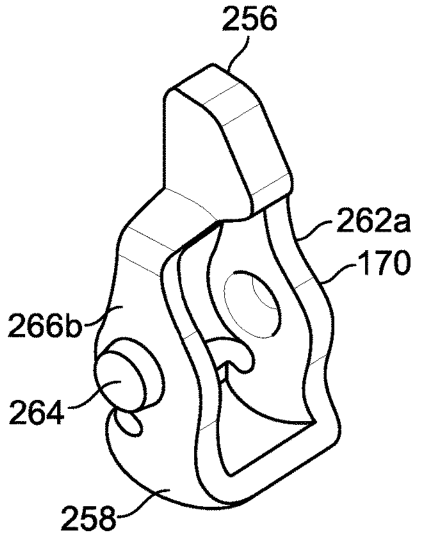

Referencing FIGS. 7A-7B, the multiplier link 170 includes opposing front and rear walls 262*a*, 262*b* and opposing first and second side walls 266*a*, 266*b*. Further, as indicated by at least FIGS. 5A-5D, the multiplier link 170 is pivotally coupled to the cover housing 208. According to the illustrated embodiment, pins 264 outwardly extend from each of the first and second side walls 266*a*, 266*b*, and are sized to be received in mating aperture in corresponding adjacent first and second side portions 236*a*, 236*b* of the cover housing 208. Alternatively, rather than having pins 264 that are integral to the multiplier link 170, one or more pins can extend into one or more pin apertures in the multiplier link 170. Such embodiments can include one or more pins that are, or are not, integral to the cover housing 208. Additionally, whether the pins are integral to the multiplier link 170 or received in an aperture of the multiplier link 170, the pins can provide a multiplier axis 267 (FIG. 5D) about which the multiplier link 170 is pivotally displaced.

According to certain embodiments, the multiplier axis 267 can be offset from a midsection of the multiplier link 170, such as, for example, being closer to the lower section 258 than the upper section 256 of the multiplier link 170. Moreover, according to certain embodiments, the multiplier axis 267 can be at a location relative to the cam 176 such that the multiplier axis 267 is below, or offset from, the cam axis 238. For example, according to certain embodiments, the cam axis 238 may generally intersect or be relative close proximity to, a central longitudinal axis 268 of the latch assembly 100, while the multiplier axis 267 is offset, or at a different distance from, the central longitudinal axis 268. Such a configuration can assist in amplifying the rotational displacement of the handle such that a relatively small degree of rotation of the handle can result in the retracted of an extended latch bolt 166. For example, such retraction of the latchbolt may result from rotating the handle through an angle between about 42 degrees to about 48 degrees, and moreover about 45 degrees, among other rotational angles. Moreover, by offsetting the multiplier axis 267 from the cam axis 238, the rotational displacement of the multiplier link 170 via the linear displacement of the latch link 172 can increase the angular rotation of the multiplier link 170. For example, according to certain embodiments, the multiplier link 170 can, for example, be pivotally displaced about 70 degrees between the extended position (FIG. 5A) and the retracted position (FIGS. 5C and 5D).

According to the illustrated embodiment, the upper section 256 of the multiplier link 170 is configured to be received in an aperture 182 in the latch bar 168, as demonstrated by at least FIGS. 1A, 1E and 5A-5D. According to such an embodiment, when the bolt fastener 184 is positioned within the first or the second retention recess 202, 204, and the multiplier link 170 is at the extended first position (FIG. 5A), as one or both of the cams 176 are rotated, the latch link 172 is linearly displaced toward the first end 210*a* of the latch assembly 100 such that the latch link 172 provides a pushing or pulling force against the lower section 258 of the multiplier link 170 that facilitates the rotation of the multiplier link 170 in a first rotational direction ($R_1$). During such rotation, the upper section 256 can, via engagement with the latch bar 168, communicate a force against the latch bar 168 that can push or pull the latch bar 168 generally toward the second end 210*b* of the latch assembly 100. As the latch bar 168 is axially displaced generally in a direction toward the second end 210*a* of the latch assembly 100, the latch bolt 166 can be displaced to the retracted position, as illustrated in at least FIG. 5C.

According to the illustrated embodiment, as shown in at least FIGS. 5A-5D, as the multiplier link 170 is rotated, and the latch bar 168 is axially displaced, the portion of the upper section 256 of the multiplier link 170 that extends through the aperture 182 in the latch bar 168 can vary. Accordingly, in at least an attempt to prevent the front wall 262*a* of the multiplier link 170 from being rotated into contact with the latch bar 168 in a manner that could interfere with the pivotal displacement of the multiplier link 170 and/or the axial displacement of the latch bar 168, the upper section 256 of the multiplier link 170 can be inwardly tapered or angled such that the thickness of the multiplier link 170 between the front and rear walls 262*a*, 262*b* decreases in the general direction of the upper section 256.

Referencing FIG. 5A, when a cam 176 is rotatably displaced in a first rotational direction ($R_1$), the lower section 258 of the cam 176 is rotated toward the lower segment 250 of the latch link 172. As illustrated in FIGS. 5A and 5B, as the foot portion 244 of the cam 176 engages the lower segment 250 of the latch link 172 (i.e., the lower end wall 254), the latch link 172 can be linearly displaced in the general direction of the multiplier link 170. More specifically, the latch link 172 can exert a pushing force against the lower section 258 of the multiplier link 170 such that the multiplier link 170 also rotates in the first rotational direction ($R_1$). Such rotation of the multiplier link 170 can result in the upper section 256 of the multiplier link 170 being rotated generally in the direction of the second end 210*b* of the latch assembly 100. Further, the multiplier link 170 can be coupled to the latch bar 168 (such as, for example, by the upper section extending through an aperture 182 of the latch bar 168) such that the rear wall 262*b* can exert a force against a portion of the latch bar 168 that generally defines the aperture 182 in a manner that allow the multiplier link 170 to push or pull the latch bar 168, (and thus the latch bolt 166 that is coupled to the latch bar 168) generally toward the second end 210*b* of the latch assembly 100, and moreover, to the associated unlocked, retracted position.

When the force that was applied to rotate the doorknob or lever is removed, biasing forces of the latch assembly 100 (including, for example, the biasing force of the bolt biasing element 174) can at least assist in displacing the latch bolt 166 back to the extended, locked position. Such displacement can also facilitate similar displacement of the latch bar 168, which can exert a force against the front wall 262*a* of the multiplier link 170 that facilitates the rotation of the multiplier link 170 in a second direction that is opposite of the first rotational direction ($R_1$). Such rotation of the multiplier link 170 can also facilitate the lower section 258 of the multiplier link 170 exerting a force against the lower segment 250 (such as, for example, the lower end wall 254), which facilitates the displacement of the latch link 172 in a direction toward the second end 210*b* of the latch assembly 100. According to certain embodiments, such displacement of the latch link 172 can also be facilitated by the cam 176 being directly or indirectly biased to a neutral position, as shown in FIG. 5A, by biasing elements that may prevent lever droop, and which thereby can prevent at least the foot portion 244 of the cam(s) 176 from interfering or providing resistance to such displacement.

Referencing FIG. 1A, the dead latch assembly 104 can include a plunger 272, a plunger biasing element 274, and the dead latch link 142. The dead latch assembly 104 can provide an anti-burglar feature that can at least assist in preventing an unauthorized attempt to retract the latch bolt 166 from the extended position using an external object (i.e., a credit card or similar object) when the associated entryway device is in a closed position. Moreover, in at least certain installations of the latch assembly 100, the latch bolt 166 can be relatively slightly visible, such as, for example, visible in an area or door gap between the entryway device and the adjacent frame or wall. Such situations can provide an unauthorized opportunity to insert an object in the door gap and use the object to push the latch bolt 166 away from the extended position. However, as discussed below, the dead latch assembly 104, including the plunger 272 and the dead latch link 142, can be structured and positioned to block such illicit attempts to use such objects to displace the latch bolt 166 from the extended position to the retracted position. For example, as discussed below, the dead latch link 142 can be tilted between a dead-latching position and a release position. According to the illustrated embodiment, when in the dead-latching position, the dead latch link 142 is positioned to prevent displacement of the latch bolt 166 to the retracted position.

Figure 8A:
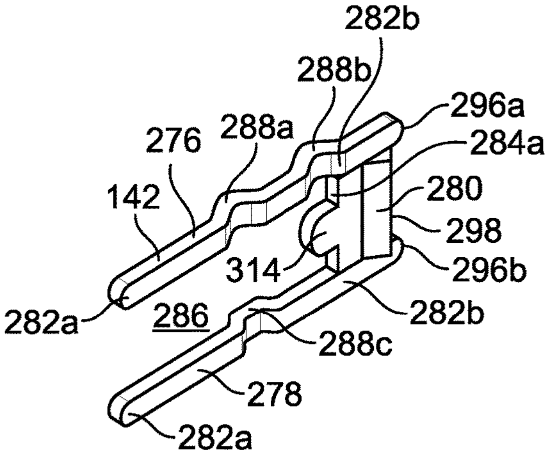
FIGS. 8A and 8B illustrate opposing side perspective views of a dead latch link according to certain embodiments of the present application.
Figure 8B:
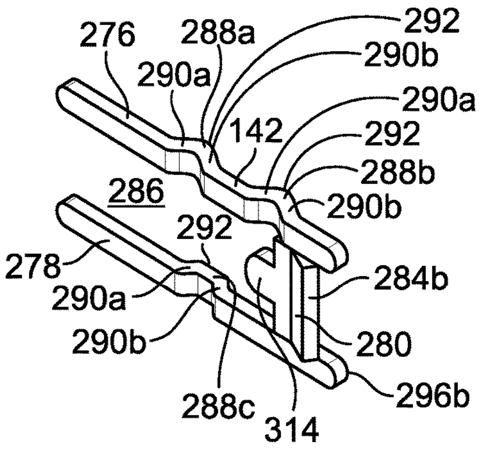

The dead latch link 142 can have a variety of shapes and configurations. For example, referencing FIGS. 8A and 8B, according to the illustrated embodiment, the dead latch link 142 includes an upper first arm 276, a lower second arm 278, and a base portion 280. The first and second arms 276, 278 each have a second end 282*b* that can be coupled to a first side 284*a* of the base portion 280, and extend to an opposing first end 282*a*. Further, according to certain embodiments, the first and second arms 276, 278 are generally parallel to each other and outwardly extend from the base portion 280 in generally the same direction. Additionally, the first and second arms 276, 278 can be separated from each other by a gap 286. According to the illustrated embodiment, the first and second arms 276, 278 can include one or more bends 288*a*, 288*b*, 288*c*. The bends 288*a*, 288*b*, 288*c* can have a variety of shapes and configurations that provide an extension or protrusion along the arms 276, 278. For example, according to certain embodiments, the bends 288*a*, 288*b*, 288*c* generally include a pair of diverging legs 290*a*, 290*b* that can be joined at or near an intersection, apex, or land 292 between the legs 290*a*, 292*b*.

Figure 3A:
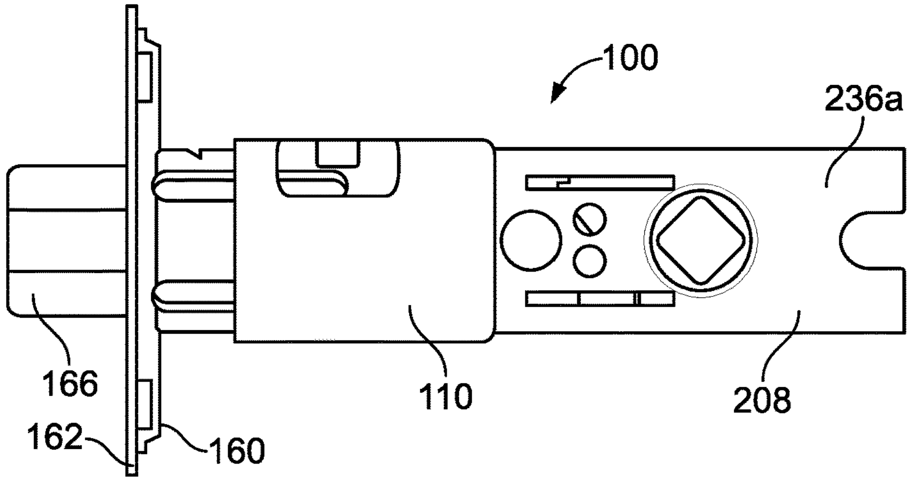
FIG. 3A illustrates a side view of a latch assembly for a second backset setting according to an illustrated embodiment of the present application.

According to the illustrated embodiment, one of the first and second arms 276, 278 includes a pair of bends 288*a*, 288*b* while the other of the first and second arms 276, 278 includes one bend 288*c*. According to the illustrated embodiment, a first bend 288*a* of the first arm 276 is positioned for use when the latch assembly 100 is at the first backset setting, and a second bend 288*b* of the first arm 276 that is positioned for use when the latch assembly 100 is at the second backset setting. Referencing FIGS. 3A and 3B, according to such an embodiment, during use, as discussed below, when the latch assembly 100 is at the first backset setting, an extension 294 of the latch bar 168 can contact the first bend 288*a* when the latch bar 168 is being displaced toward the second end 210*b* of the latch assembly 100 in a manner that can facilitate the dead latch link 142 being tilted from a dead-link position (FIG. 3B) to the release position (FIG. 3C). As shown in FIG. 3C, according to the illustrated embodiment, the extension 294 of the latch bar 168 can be engaged with the land 292 of the bend 288*a* at least when the dead latch link 142 is at the release position. Similarly, when the latch assembly 100 is at the second backset setting, the extension 294 of the latch bar 168 can be in contact with the second bend 288*b* by operation of the latch assembly 100 that facilitates the tilting of the dead latch link 142 from the dead-latching position (FIG. 4B) to the release position (FIG. 4C).

According to certain embodiments, the dead latch link 142 can be coupled to the cover housing 208 in a manner that forms a pivot or hinge about which the dead latch link 142 can be tilted between the dead-latching position and the release position. For example, according to the illustrated embodiment, the dead latch link 142 includes first and second legs 296*a*, 296*b* that extend from a second side 284*b* of the base portion 280, and which are generally parallel to each other. Additionally, the first and second arms 276, 278 are separated from each other to form an opening 298 that is sized to receive an extension 300 of the cover housing 208, as shown in at least FIG. 3D. According to such an embodiment, the first and second legs 296*a*, 296*b* can engage the extension 300 in a manner that facilitates the tilting of the dead latch link 142.

Figure 3B:
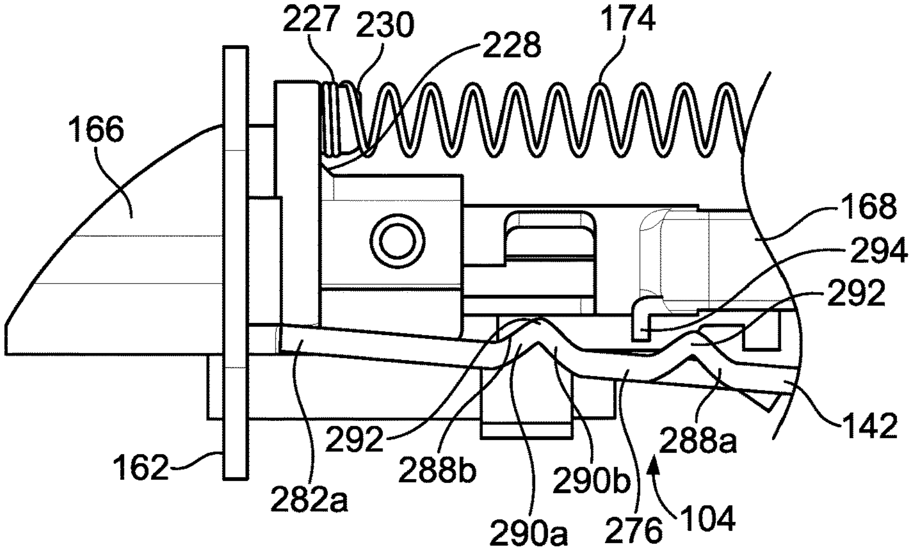
FIG. 3B illustrates a side view of a dead latch assembly for a second backset setting with a dead latch link tilted to a dead-latching position according to an illustrated embodiment of the present application.
Figure 3C:
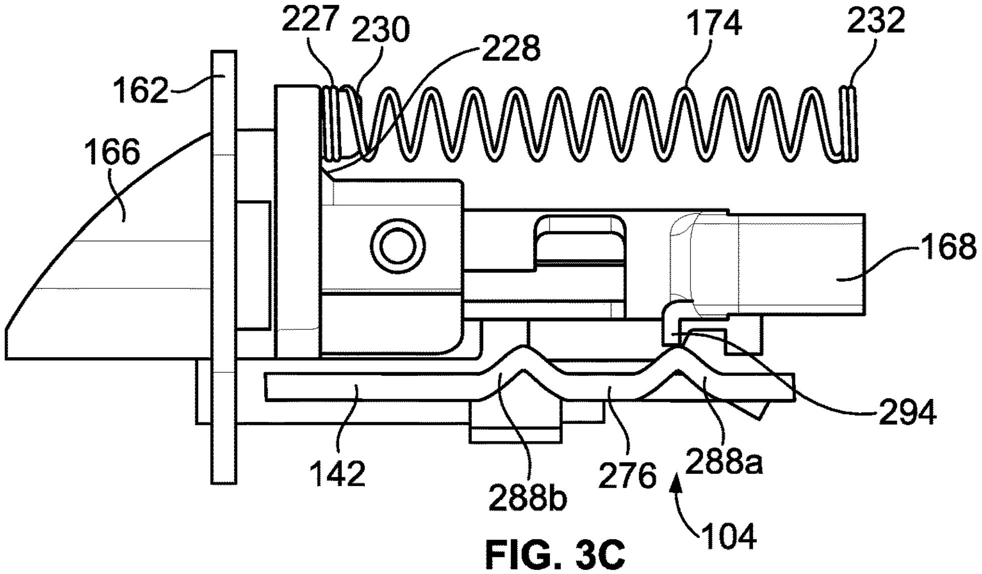
FIG. 3C illustrates a side view of a dead latch assembly for a second backset setting with a dead latch link tilted to a release position according to an illustrated embodiment of the present application.
Figure 3D:
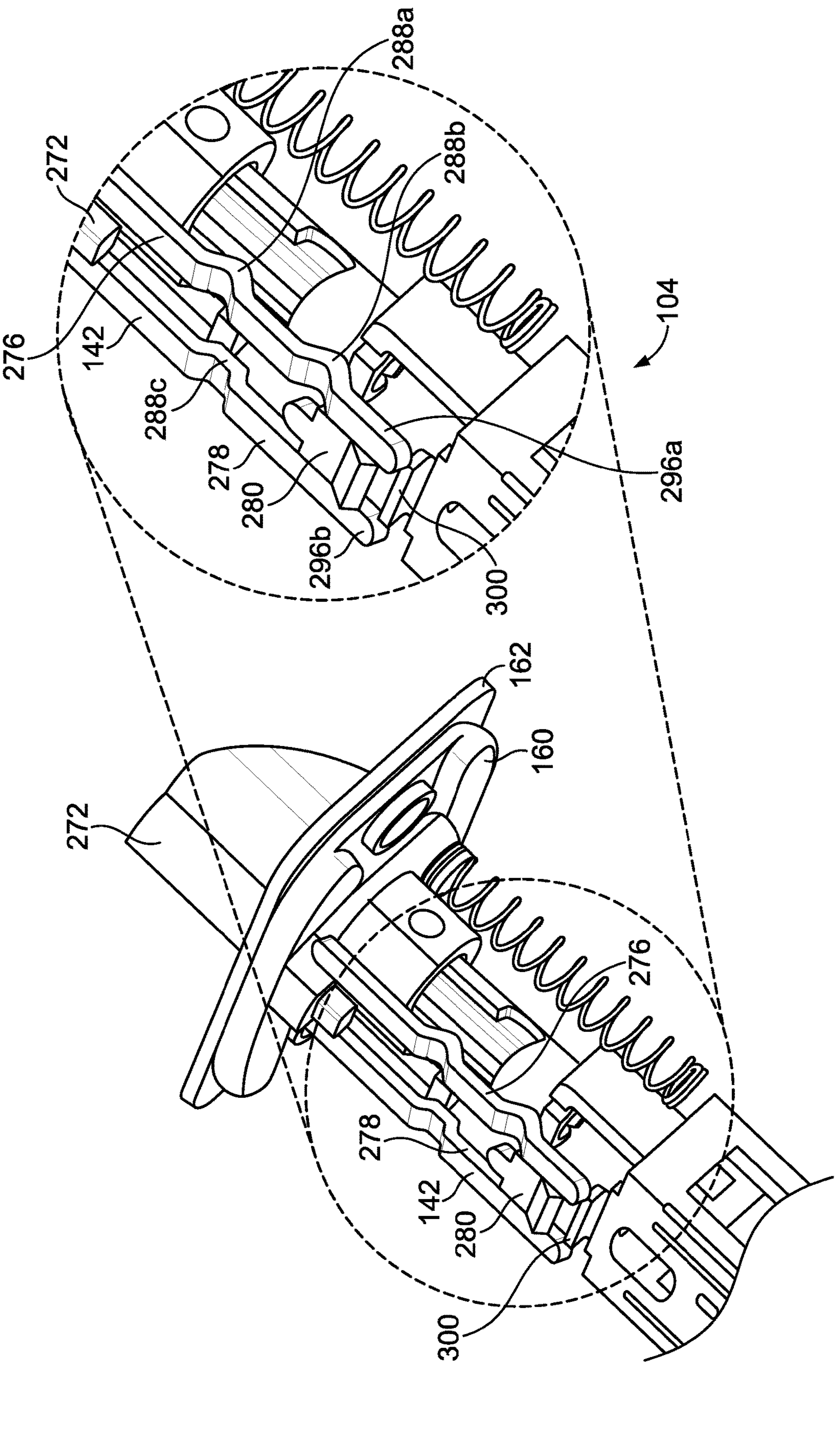
FIG. 3D illustrates a perspective view of a portion of a latch assembly having a plunger of a dead latch assembly positioned to facilitate the tilting of a dead latch link to a release position according to an illustrated embodiment of the present application.
Figure 3E:
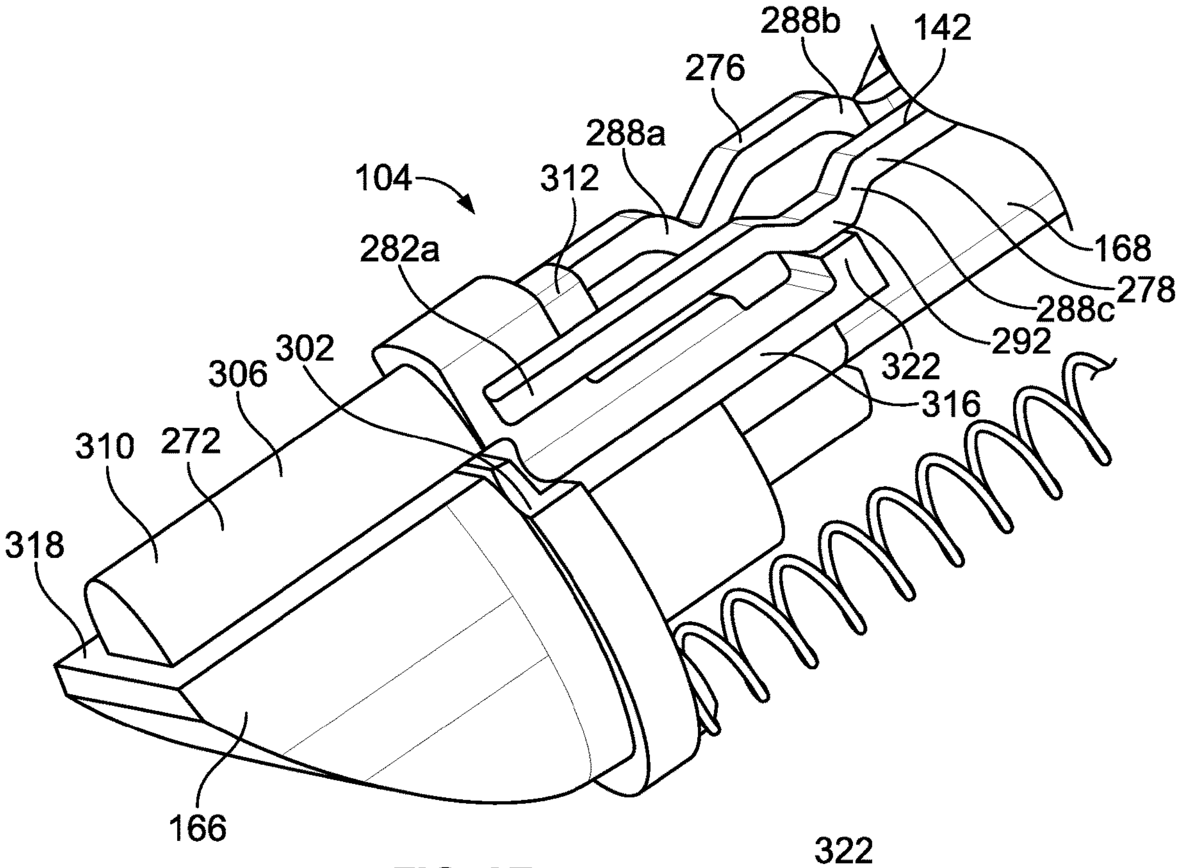
FIG. 3E illustrates a side perspective view of a portion of the latch assembly shown in FIG. 3D in a first state.
Figure 3F:
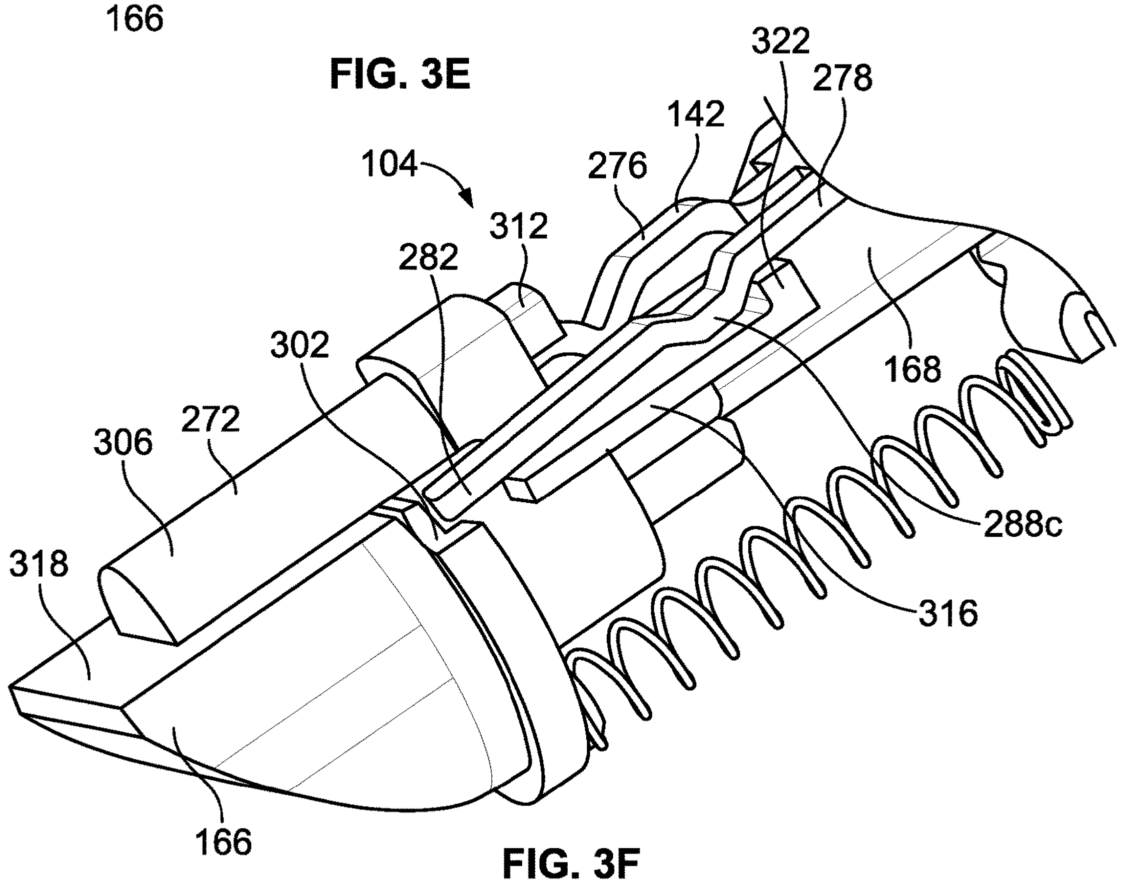
FIG. 3F illustrates a side perspective view of the portion of the latch assembly shown in FIG. 3D in a second state.
Figure 4B:
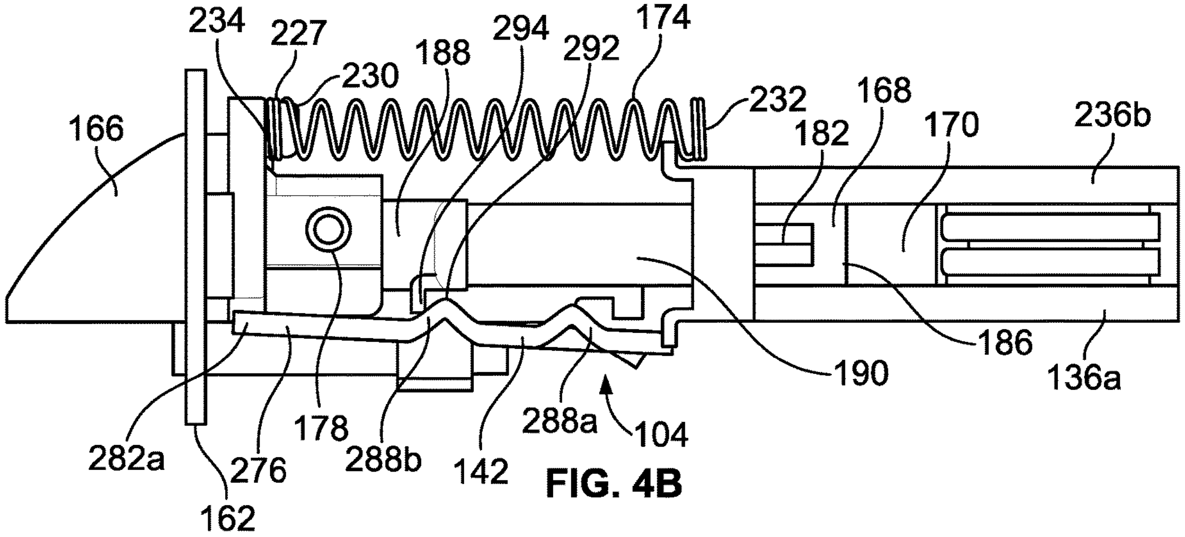
FIG. 4B illustrates a side view of a dead latch assembly for a first backset setting with a dead latch link tilted to a dead-latching position according to an illustrated embodiment of the present application.
Figure 4C:
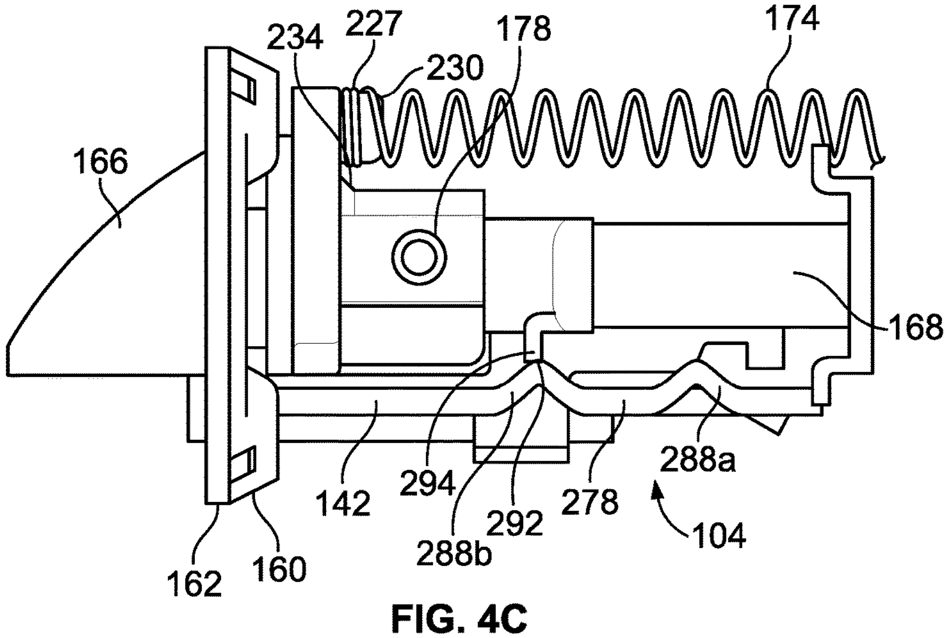
FIG. 4C illustrates a side view of a dead latch assembly for a first backset setting with a dead latch link tilted to a release position according to an illustrated embodiment of the present application.

When in the dead-latching position, as shown, for example, in at least FIGS. 3B, 3F and 4B, the dead latch link 142 can be tilted in a manner in which the first end 282*a* of one or both of the first and second arms 276, 278 of the dead latch link 142 is received within one or more recesses 302 (e.g., FIGS. 3E, 3F and 11) in the latch bolt 166. More specifically, when in the dead-latching position, and the latch bolt 166 is at an extended position, the first and second arms 276, 278 of the dead latch link 142 can be positioned adjacent to one or more back walls 304 (FIG. 11) of the latch bolt 166 such that the dead latch link 142 provides an obstruction that prevents or interferes with the displacement, or retraction, of the latch bolt 166 in the general direction of the second end 210*b* of the latch assembly 100. Conversely, when in the release position, as shown, for example, in at least FIGS. 3C-3E and 4C, the dead latch link 142 can be at a titled positioned at which the dead latch link 142 does not impede the displacement of the latch bolt 166 from the extended position to the retracted position.

Figure 6A:
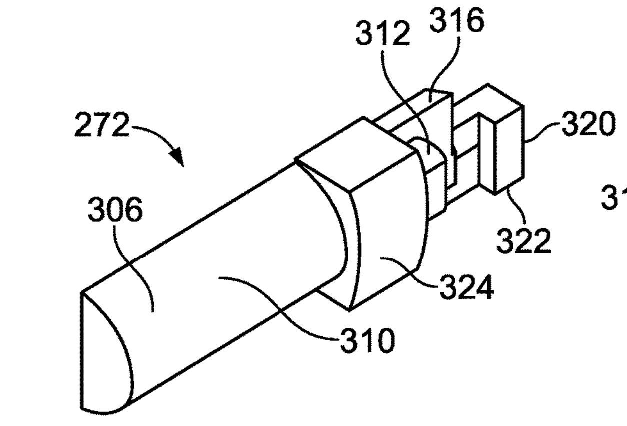
FIGS. 6A and 6B illustrate opposing side perspective views of a plunger according to certain embodiments of the present application.
Figure 6B:
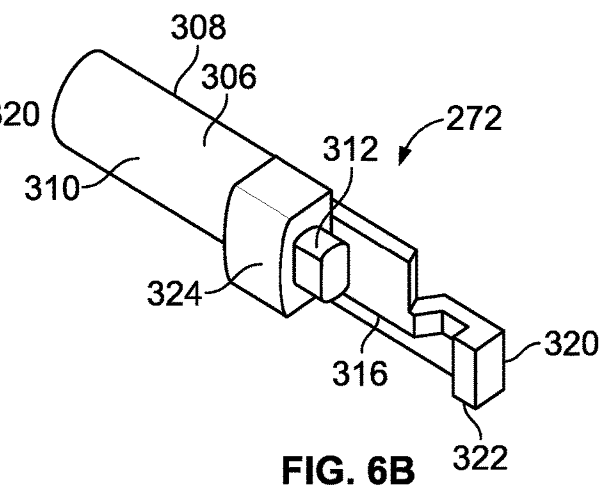

The plunger 272 can also have a variety of shapes and configurations. For example, FIGS. 6A and 6B illustrate an embodiment of a plunger 272 having a main body 306 that generally has a half-cylindrical shape. Moreover, according to certain embodiments, at least a portion of the first side 308 of the plunger 272 can be generally flat, while at least a portion of an opposing second side 310 of the plunger 272 along a longitudinal length of the plunger 272 generally has a curved shape. At least a portion of the first side 308 can be configured to abut against, or otherwise be in relative close proximity to a sidewall 318 (FIG. 11) of the latch bolt 166. The main body 306 of the plunger 272 can also, according to the illustrated embodiment, include a guide portion 324 that is sized to occupy a portion of the gap 286 between the first and second arms 276, 278 of the dead latch link 142 in a manner that may at least assist in guiding the linear displacement of the plunger 272 and/or retain the gap 286 between the first and second arms 276, 278.

According to certain embodiments, a hub 312 may extend from a back wall of the main body 306, the hub 312 being sized to at least assist in retaining a position of the plunger biasing element 274. More specifically, according to the illustrated embodiment, a first end of the plunger biasing element 274 can be positioned about the hub 312 of the plunger 272, while an opposing second end of the plunger biasing element 274 is positioned about a projection 314 that extends from the base portion 280 of the dead latch link 142. According to such an embodiment, the plunger biasing element 274 can provide a force that seeks to bias the plunger 272 to the extended position such that the plunger 272 can, at least in certain circumstances, outwardly extend with the latch bolt 166 when the latch bolt 166 is at an extended, locked position.

The plunger 272 can also include a plunger arm 316, which can extend from the back wall of the main body 306 of the plunger 272. Additionally, as shown in at least FIGS. 3E, 3F and 11, according to certain embodiments, at least a portion of the plunger 272 can be configured to engage a portion of a back wall 304 of the latch bolt 166 at least in certain situations in which the first side 308 of the main body 306 is adjacent to, or abuts, a mating sidewall 318 of the latch bolt 166. Further, according to certain embodiments, during at least certain times during the operation of the latch assembly 100 a portion of the plunger arm 316 can be positioned in the recess 302 in the latch bolt 166. According to such embodiments, when the plunger arm 316 is adjacent to the back wall 304 of the latch bolt 166 and/or within the recess 302 of the latch bolt 166, displacement of the latch bolt 166 from the extended position to the retracted position can facilitate similar linear displacement of the latch bolt 166 toward the second end 210*b* of the latch assembly 100. Further, such displacement can result in the plunger 272 being concealed within the latch assembly 100.

According to the illustrated embodiment, the plunger arm 316 may extend from the main body 306 in a linear direction that is generally parallel to a central longitudinal axis of the plunger 272. Further, a distal end 320 of the plunger arm 316 may include a plunger finger 322 that generally extends in a direction that is non-parallel to the plunger arm 316. For example, according to the illustrated embodiment, the plunger finger 322 can be generally orthogonal relative to the plunger arm 316. Further, according to certain embodiments, the plunger finger 322 can be positioned to engage the bends 288*a*, 288*b*, 288*c* of the first and/or second arms 276, 278 of the dead latch link 142 in a manner that can facilitate the tilting of the dead latch link 142 between the dead-latching position and a release position. According to the illustrated embodiment, the plunger finger 322 is positioned to engage the single bend 288*c* of the second arm 278, and not the bends 288*a*, 288*b* of the first arm 276, of the dead latch link 142 in a manner that can facilitate the tilting of the dead latch link 142 to the dead-latching position.

According to certain embodiments, during use, when the latch bolt 166 is in an extended, locked position, the dead latch link 142 can be in the dead-latching position so as to block displacement of the latch bolt 166 to the retracted, unlocked position. In such a situation, a user can rotate a lever or doorknob so as to facilitate the rotational displacement of one of the cams 176. As previously discussed, such rotation of the cam 176 can facilitate the linear displacement of the latch bar 168, which can, depending on whether the latch assembly 100 is at the first or second backset setting, bring the extension 294 into contact with the first or the second bend 288*a*, 288*b* in a manner that can facilitate the dead latch link 142 being tilted to the release position, as shown in at least FIGS. 3C and 4C. With the dead latch link 142 in the release position, the dead latch link 142 may not interfere with the displacement of the latch bolt 166 from the extended position to the retracted position.

As previously discussed, with the dead latch link 142 in the tilted position and the latch bolt 166 being retracted, a portion of the plunger 272 can be engaged, or positioned to be engaged, with the latch bolt 166 (such as, for example, the plunger arm 316 being engaged with the latch bolt 166), such that the plunger 272 is also linearly displaced with the latch bolt 166 toward the second end 210*b* of the latch assembly 100. Further, according to certain embodiments, the plunger 272 can be displaced to a position within the latch assembly 100 such that the latch bolt 166 does not protrude, or protrudes in a relatively small amount, out from the face plate 162 of the latch assembly 100. Additionally, as the plunger 272 is displaced toward the second end 210*b* of the latch assembly 100, the plunger finger 322 can be displaced into engagement with the bend 288*c* in the second arm 278 of the dead latch link 142, as shown in at least FIG. 3E, so that the plunger finger 322 can engage the bend 288*c* in the second arm 278 in a manner that can at least assist in retaining the dead latch link 142 in the release position.

Conversely, when the latch bolt 166 is being displaced from the retracted position to the extended position (i.e., by the biasing force of the bolt biasing element 174), the plunger 272 can at least initially remain within the latch assembly 100. According to such an embodiment, while the latch bolt 166, and thus the latch bar 168, is linearly displaced toward the extended position, the extension 294 of the latch bar 168 may move away from being in contact with at least the land 292 of the first and second bends 288*a*, 288*b*. However, as the position of the plunger 272 is generally at least temporarily retained, the plunger finger 322 can remain engaged with the bend 288*c* of the second arm 278 such that the dead latch link 142 remains in the release position. According to the illustrated embodiment, when the back wall 304 and/or recesses 302 of the latch bolt 166 are positioned to receive placement of, and/or be adjacent to, at least the first ends 282*a* of the first and second arms 276, 278 of the dead latch link 142, the midsection 192 of the latch bar 168 may engage the plunger 272 in a manner that generally linearly displace the plunger 272 to an extended position. Such displacement of the plunger 272 can disengage the plunger finger 322 from the bend 288*c* of the second arm 278 such that the dead latch link 142 returns to the dead-latching position.

FIGS. 13A-15B illustrate features of an alternative embodiment of a dead latch assembly 104', and associated components, and which includes a dead latch link 142', at least one biasing element 326*a*, 326*b*, and a plunger 272', and which can be used with at least the latch bar 168' that is depicted in FIGS. 12A and 12B. As shown in at least FIGS. 13A and 13B, according to the illustrated embodiment, the dead latch link 142' has a base portion 280' and two opposing side portions 328*a*, 328*b*. A protrusion 330 can extend from a first side 332*a* of the base portion 280' and be adapted to engage the latch bar 168', while a tab 334 can be positioned at an opposing second side 332*b* of the base portion 280'. The side portions 328*a*, 328*b* can extend from opposing sides of the base portion 280' and be spaced apart by a space 336 that is sized to receive placement of at least a portion of the plunger 272', latch bar 168', and/or the latch bolt 166'. Additionally, one or more of the side portions 328*a*, 328*b* can include an arm segment 338 about which at least a portion of a second end of a biasing element 326*a*, 326*b* can be positioned. According to the illustrated embodiment, the at least one biasing element 326*a*, 326*b* can include a first biasing element 326*a* and a second biasing element 326*b*. Additionally, according to certain embodiments, the dead latch link 142' can be pivotally coupled to the latch assembly 100 such that the dead latch link 142' can be tilted between the dead-latching position and the release position, as discussed below.

The plunger 272' has a main body 306' and an arm 340. The main body 306' extends between a first end 324*a* and a second end 342*b*, and can include a cavity 344 that is sized to receive insertion of at least a portion of a first biasing element 326*a*. Moreover, a first end of the first biasing element 326*a* can be positioned to abut a wall 346 at or near an end of the cavity 344 and/or be positioned about a hub that extends from the wall 346. The arm 340 can extend from a portion of the second end 342*b* of the main body 306' (i.e., a corner and/or side of the main body 306'), and includes an upper wall 348 and a recessed section 350 that is configured to at least assist with, and/or not interfere with, the tilting of the dead latch link 142' between the dead-latching position and the release position. For example, according to the illustrated embodiment, the recessed section 350 can be a generally inwardly-curved or convex surface that can engage at least a portion of a mating, generally outwardly-curved or concave surface of the protrusion 330. According to certain embodiments, the arm 340 can be offset from a central longitudinal axis of the main body 306'.

Figure 16A:
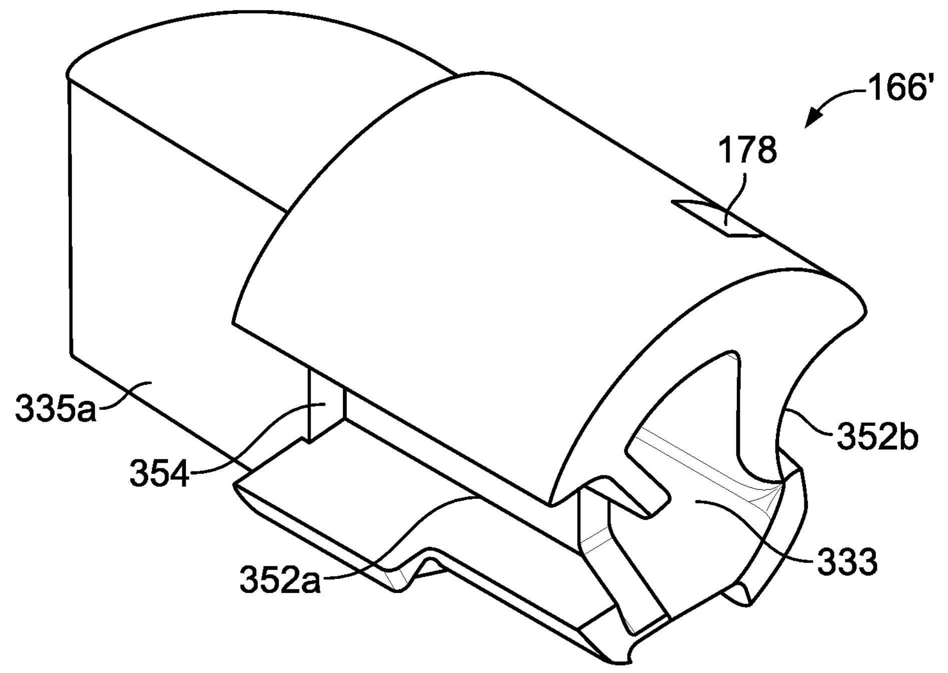
FIGS. 16A and 16B illustrate opposing side perspective views of a latch bolt according to certain embodiments of the present application.
Figure 16B:
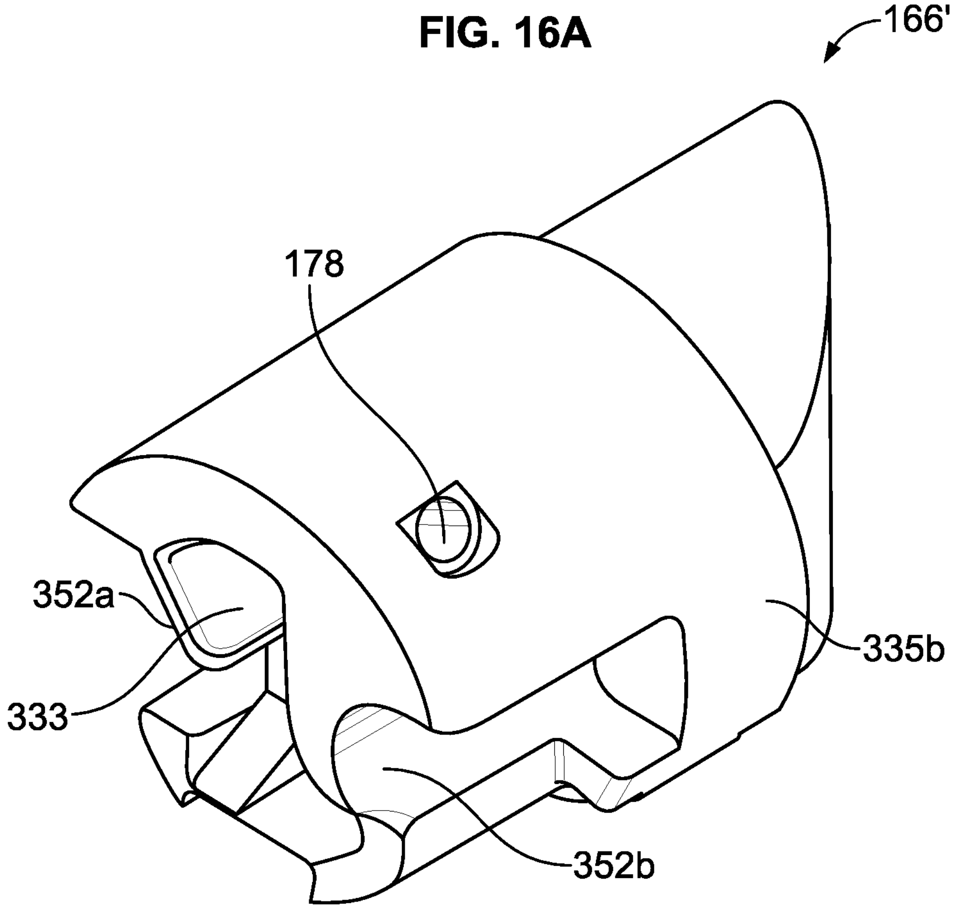

FIGS. 16A and 16B illustrate perspective views an embodiment of a latch bolt 166'. As shown, the latch bolt 166' includes an orifice 178 that is sized to receive insertion of a bolt fastener 184 that can secure the latch bolt 166' to the latch bar 168', and which can also be used in connection with adjustments between the latch bar 168' and the latch bolt 166' that correspond to the first and second backset settings. Additionally, according the illustrated embodiment, the latch bolt 166' includes an aperture 333 that is sized to receive insertion of the latch bar 168', as well as accommodate changes in the relative angular positions of the latch bolt 166' and latch bar 168' when, and if, the backset setting is adjusted.

As illustrated in at least FIG. 16A, a first side 335*a* of the latch bolt 166' can include a first passageway 352*a* that is configured to slidingly receive the plunger 272'. When the plunger 272' is positioned within the first passageway 352*a*, the plunger 272' can be adjacent to an end wall 354 of the first passageway 352*a*. When the latch bolt 166' is being retracted with a force that can overcome at least the biasing force of the first biasing element 326*a*, the end wall 354 of the first passageway 352*a* can engage the plunger 272' in a manner that can facilitate the displacement of the plunger 272' into the latch assembly 100.

As shown in FIG. 16B, a second side 335*b* of the latch bolt 166' includes a second passageway 352*b* that is sized to receive insertion of at least a portion of the second biasing element 326*b*. Thus, according to the illustrated embodiment, the second biasing element 326*b* may extend between the dead latch link 142' and the latch bolt 166'. Further, according to certain embodiments, the first and second biasing elements 326*a*, 326*b* can be configured to at least assist in biasing the latch bolt 166' to the extended position.

Figure 15A:
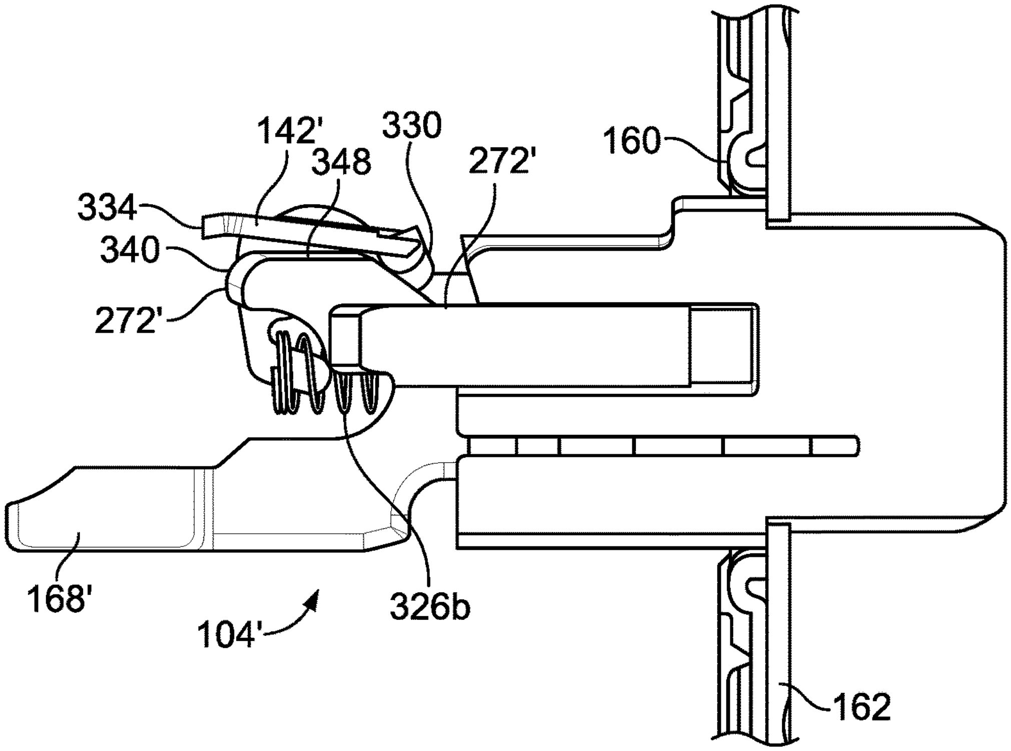
FIGS. 15A and 15B illustrate a side view and a side perspective view, respectively, of a dead latch assembly and a latch bolt according to certain embodiments of the present application.
Figure 15B:
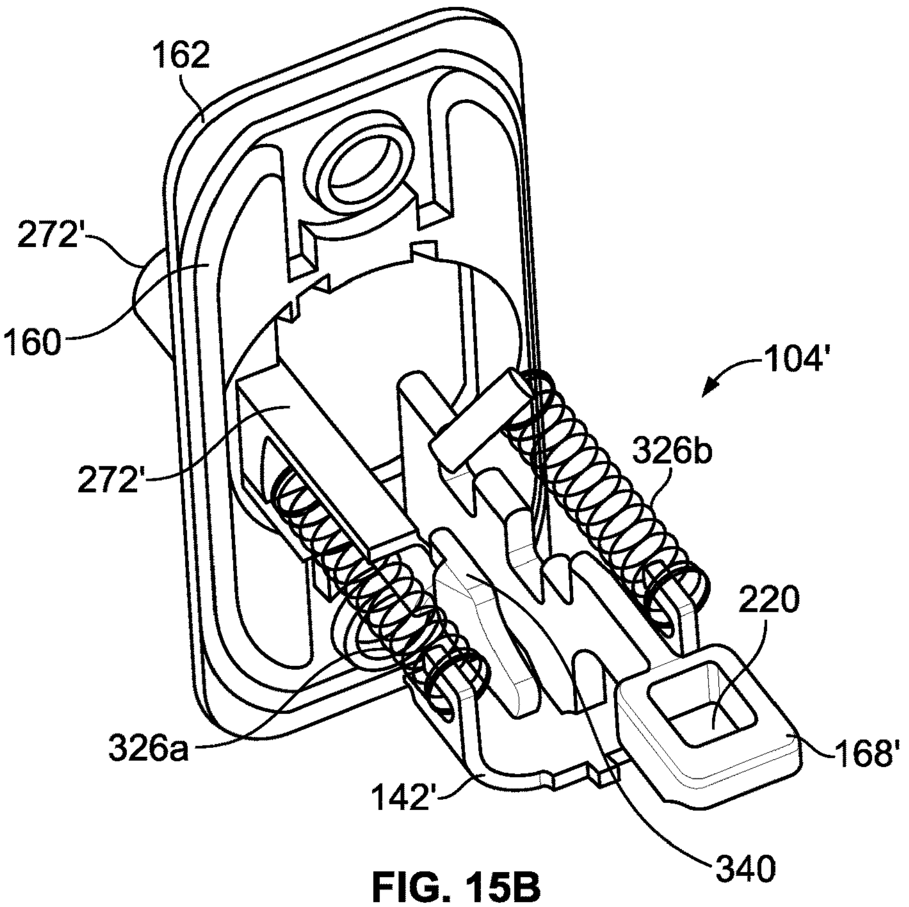

FIGS. 15A and 15B illustrate embodiments in which the dead latch assembly 104' and associated components, as depicted in at least FIGS. 13A-14B and 16A-16B, are utilized to provide a dead latching feature that can prevent unauthorized or illicit retraction of the latch bolt 166' from the extended position. When the latch bolt 166' and plunger 272' are in the extended position, the protrusion 330 that extends from the first side 332*a* of the base portion 280' of the dead latch link 142' can rest upon the upper wall 348 of the arm 340 of the plunger 272' so as to be in a release position. When at least the plunger 272' is inwardly displaced toward the second end 210*b* of the latch assembly 100, the relative positions of the dead latch link 142' and the arm 340 can change such that the dead latch link 142' can be tilted into the recessed section 350 of the arm 340. In such a situation, the dead latch link 142' can be in a dead-latching position in which the dead latch link 142' is positioned to prevent displacement of the latch bar 168' in the retracted direction, and thereby prevent retraction of the latch bolt 166'.

According to certain embodiments, depending on whether the latch assembly 100 is set for the first backset setting or the second backset setting, with the dead latch link 142' in the dead-latching position, the protrusion 330 of the dead latch link 142' can engage, or be adjacent to, the first or second abutment surfaces 224, 226 of the latch bar 168'. With the dead latch link 142' in the dead-latching position, rotation of a lever or doorknob that is coupled to the latch assembly 100 can, as previously discussed, facilitate the displacement of the latch bar 168' toward the second end 210*b* of the latch assembly 100. As the latch bar 168' is linearly displaced in the general direction of the second end 210*b* of the latch assembly 100, the shape(s) of the protrusion 330 of the dead latch link 142' and/or of the engaged first or second abutment surfaces 224, 226 of the latch bar 168' can facilitate the lifting of at least the protrusion 330 of the dead latch link 142' such that the dead latch link 142' is tilted to the release position. With the dead latch link 142' in the release position, the dead latch link 142' may be moved to a location at which the dead latch link 142' does not interfere with the displacement of the latch bar 168', and thus the latch bolt 166', to the retracted position.

When the latch bolt 166' subsequently returns from the retracted position to the extended position, the latch bar 168' can be displaced in a manner that linearly displaces the latch bolt 166' to the extended position. During such displacement, the plunger 272' can, at least temporarily, remain in a retracted position in the latch assembly 100 at least until a biasing force of the first and/or second biasing elements 326*a*, 326*b* displaces the plunger to the extended position. As the plunger 272' returns to the extended position, the relative positions of the plunger 272' and the dead latch link 142' can change such that the dead latch link 142' is positioned adjacent to the upper wall 348 of the arm 340, thereby facilitating the dead latch link 142' to be tilted to the release position.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law.

Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A latchbolt assembly, comprising:

a latchbolt operable to move between an extended position and a retracted position;

a latch link operable to move in a latch link retracting direction; and a multiplier link engaged between the latch link and the latchbolt such that movement of the latch link in the latch link retracting direction drives the latchbolt toward the retracted position in a direction opposite the latch link retracting direction.

2. The latchbolt assembly of claim 1, further comprising a latch bar coupled to the latchbolt and configured to move the latchbolt in a latchbolt retracting direction from the extended position toward the retracted position when the latch bar is driven in a latch bar retracting direction; and wherein the multiplier link is engaged with the latch link via the latch bar such that movement of the latch link in the latch link retracting direction drives the latch bar in the latch bar retracting direction.

3. The latchbolt assembly of claim 1, further comprising:

a plunger having a projected position and a depressed position; and a dead latch link configured to prevent an externally-applied pushing force from moving the latchbolt from the extended position to the retracted position while the plunger is in the depressed position to thereby deadlock the latchbolt.

4. The latchbolt assembly of claim 3, wherein the dead latch link is operable to deadlock the latchbolt when the latchbolt assembly is in a first backset setting, and wherein the dead latch link is operable to deadlock the latchbolt when the latchbolt assembly is in a second backset setting.

5. The latchbolt assembly of claim 1, wherein the multiplier link is pivotably engaged between the latch link and the latch bar.

6. The latchbolt assembly of claim 1, further comprising a housing assembly including a first portion and a second portion that are movable relative to one another to selectively provide the latchbolt assembly with each of a first backset setting and a second backset setting.

7. The latchbolt assembly of claim 1, wherein the multiplier link is configured to translate linear movement of the latch link to linear movement of the latchbolt.

8. A method, comprising:

in response to actuation of a manual actuator, moving a latch link in a latch link retraction direction; and in response to the movement of the latch link, moving a latchbolt in a latchbolt retraction direction that is opposite the latch link retraction direction by operating a multiplier link engaged between the latch link and the latchbolt.

9. The method of claim 8, wherein operating the multiplier link comprises pivoting the multiplier link.

10. The method of claim 8, wherein moving the latchbolt further comprises causing the multiplier link to drive a latch link in the latchbolt retraction direction.

11. The method of claim 8, further comprising operating a deadlock mechanism to selectively deadlock the latchbolt.

12. The method of claim 8, wherein the latch link retraction direction is a linear direction.

13. The method of claim 8, wherein the latchbolt retraction direction is a linear direction.

14. A latchbolt assembly, comprising:

a latch link configured to move in a first direction in response to actuation of a manual actuator;

a multiplier link engaged with the latch link;

a latchbolt engaged with the multiplier link and configured to move in a second direction opposite the first direction in response to movement of the latch link in the first direction.

15. The latchbolt assembly of claim 14, wherein the multiplier link is pivotable.

16. The latchbolt assembly of claim 14, further comprising a latch bar coupled to the latchbolt; and wherein the multiplier link is engaged with the latchbolt via the latch bar.

* * * * *